United States Patent [19]

Minagawa et al.

[11] Patent Number: 5,016,001
[45] Date of Patent: May 14, 1991

[54] PATTERN DATA GENERATING SYSTEM

[75] Inventors: Tsutomu Minagawa, Fujisawa; Masahide Ohhashi, Yokohama; Naoyuki Kai, Tokyo, all of Japan

[73] Assignee: Kabushiki Kaisha Toshiba, Kawasaki, Japan

[21] Appl. No.: 302,709

[22] Filed: Jan. 27, 1989

[30] Foreign Application Priority Data

Jan. 30, 1988 [JP] Japan ............................ 63-20314

[51] Int. Cl.$^5$ ............................................ G09G 1/14
[52] U.S. Cl. ................................. 340/747; 340/744; 364/521
[58] Field of Search ............... 340/744, 747, 736, 739, 340/751, 745; 364/518, 519

[56] References Cited

U.S. PATENT DOCUMENTS

| 4,396,989 | 8/1983 | Fleming et al. ...................... 340/739 |
| 4,677,575 | 6/1987 | Redin ................................. 340/747 |
| 4,791,582 | 12/1988 | Ueda et al. .......................... 340/747 |
| 4,815,009 | 3/1989 | Blatin ................................ 340/747 |

FOREIGN PATENT DOCUMENTS 53-41017 10/1978 Japan .

OTHER PUBLICATIONS

"Principles of Interactive Computer Graphics", W. M. Newman, R. F. Sproull, McGraw-Hill, 1979, pp. 230-239, 315-331.
"The Edge Flag Algorithm—A Fill Method for Raster Scan Displays", B. D. Ackland, N. H. Weste, IEEE Transactions on Computers, vol. 30, No. 1, Jan. 1981, pp. 41-47.

Primary Examiner—Jeffery A. Brier
Attorney, Agent, or Firm—Finnegan, Henderson, Farabow, Garrett and Dunner

[57] ABSTRACT

A pattern data generating system comprises first and second bit map memories, a first control block for sequentially generating points corresponding to the boundaries of a closed curve in response to changes dx and dy along x and y directions, and writing the points in the first bit map memory, a second control block for sequentially generating points, which are required to paint an area enclosed by the closed curve, on the basis of the changes dx and dy, in accordance with a predetermined rule, and writing the points in the second bit map memory, a third control block for, if w (w is a positive integer) points b0, b1, . . . , b(w−2), and b(w−1) are present on a single scan line provided that one direction is set to be a scan direction on the second bit map memory, sequentially writing EXOR data of the points b0, b1, . . . , b(j−1) (j is not less than 0 and less than w) at positions corresponding to points b(j), and a fourth control block for obtaining pattern data by final filling or painting in which an arithmetic operation (e.g., logical OR or logical AND) of data of an arbitrary point in the first bit map memory with data of a corresponding point in the second bit map memory which stores the EXOR data is performed.

11 Claims, 21 Drawing Sheets

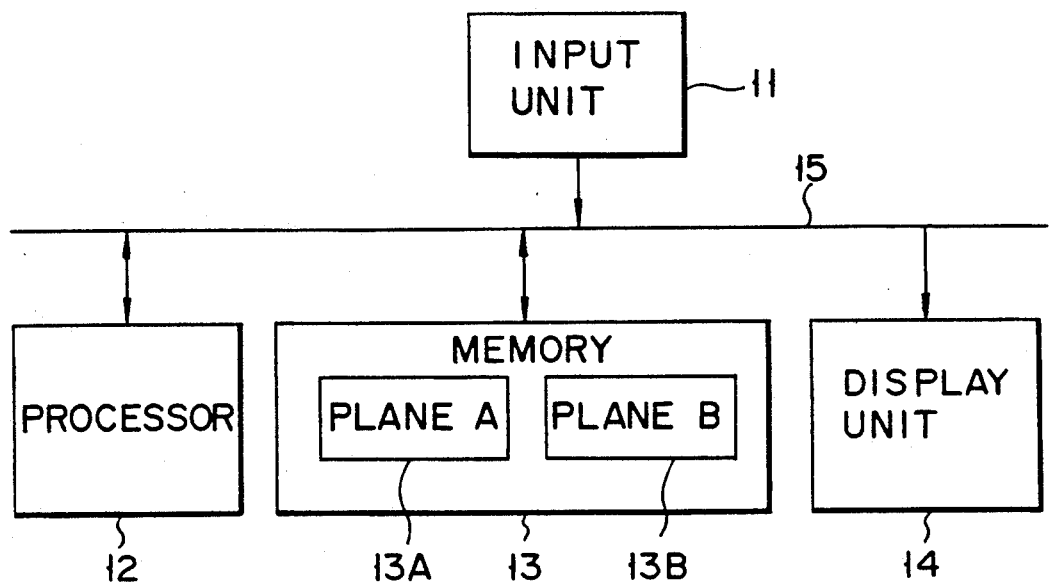
F I G. 2
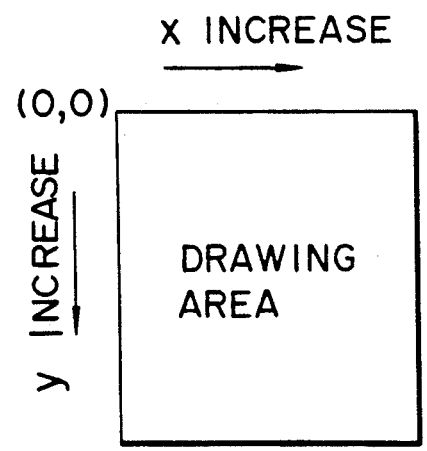
F I G. 4

| CURRENT PIXEL POSITION | | dy1 | dy | dx1 | dx | CONSTANT q WITH WHICH DATA OF PIXEL IS EXORED |
|---|---|---|---|---|---|---|
| ON HORIZONTAL LINE | | 0 | 0 | +1 / −1 | +1 / −1 | "0" |
| REFLECTION ON IDENTICAL HORIZONTAL LINE | | 0 | 0 | +1 / −1 | −1 / +1 | "1" |
| VERTICAL OR OBLIQUE LINE | | +1 / −1 | +1 / −1 | × | × | "1" |
| VERTEX OR VALLEY | | +1 / −1 | −1 / +1 | × | × | "0" |
| CORNER | HORIZONTAL → VERTICAL CLOCKWISE | 0 | +1 | +1 / −1 | × | "1" |
| | HORIZONTAL → VERTICAL COUNTER-CLOCKWISE | 0 | −1 | −1 / +1 | × | "0" |
| | VERTICAL → HORIZONTAL CLOCKWISE | +1 | 0 | × | −1 / +1 | "1" |
| | VERTICAL → HORIZONTAL COUNTER-CLOCKWISE | −1 | 0 | × | +1 / −1 | "0" |

F I G. 3

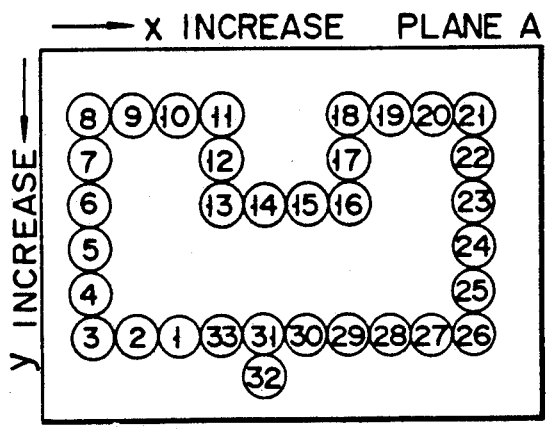
F I G. 5
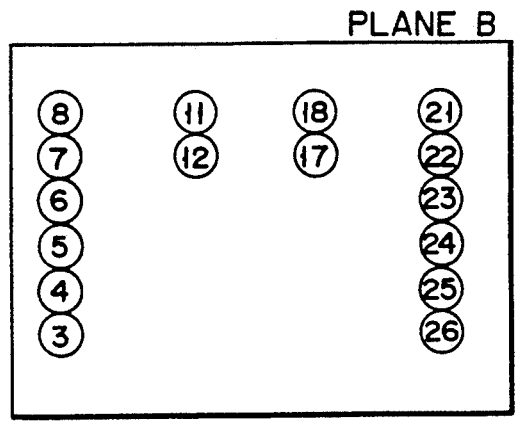
F I G. 6
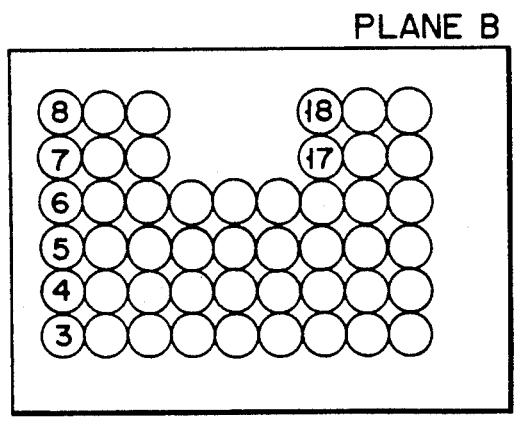
F I G. 7
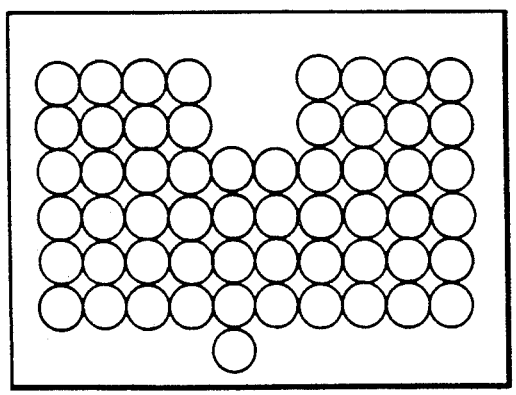
F I G. 8
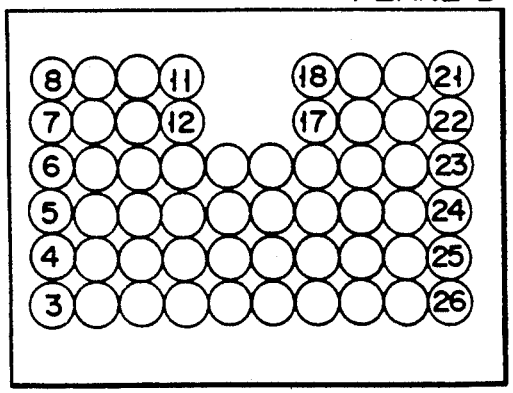
F I G. 9

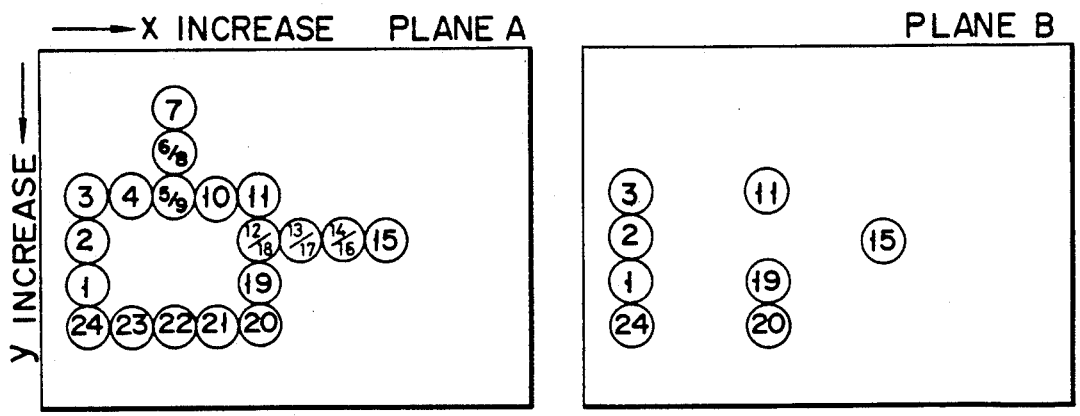
F I G. 10       F I G. 11
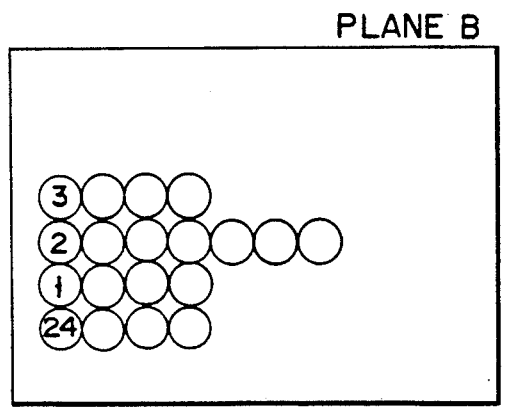
F I G. 12
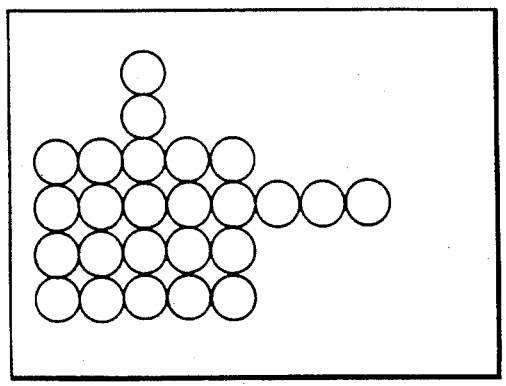
F I G. 13

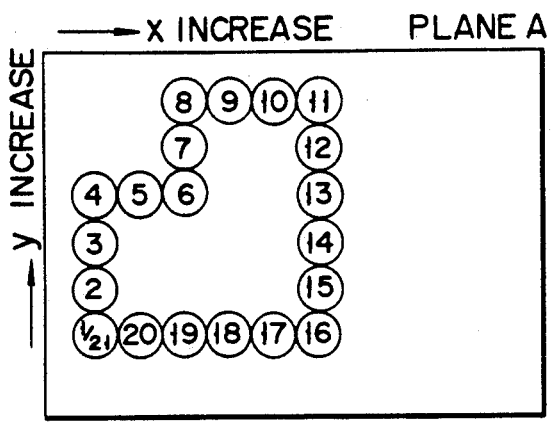
F I G. 17
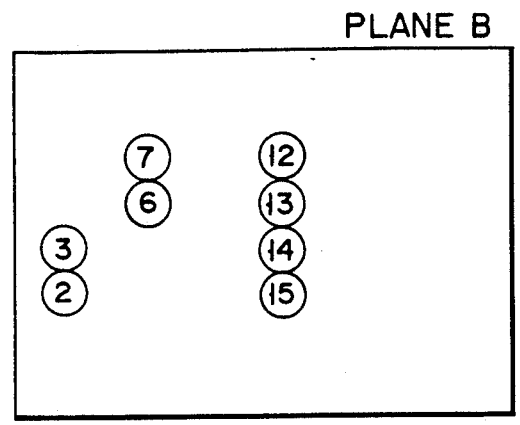
F I G. 18
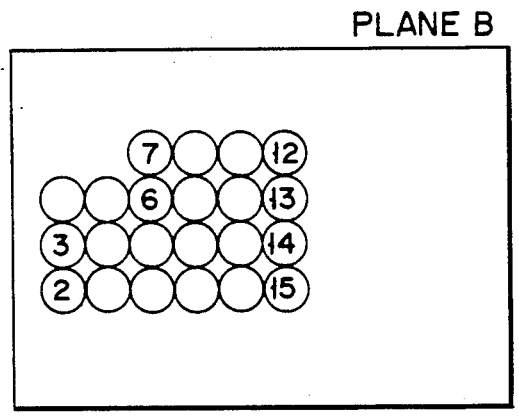
F I G. 19
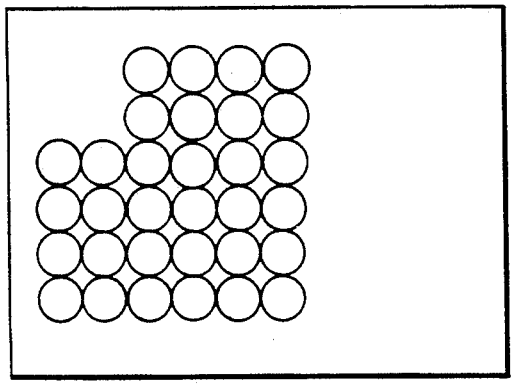
F I G. 20

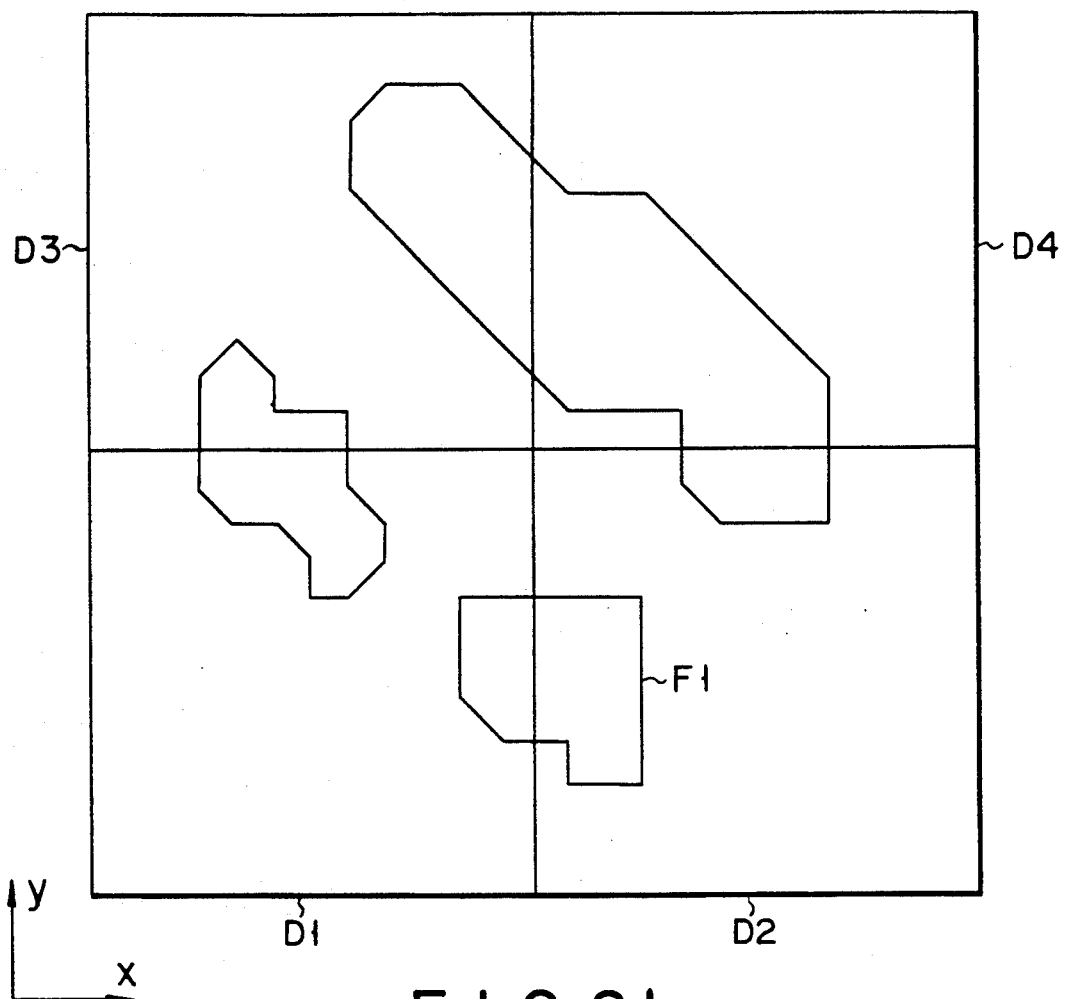
F I G. 21
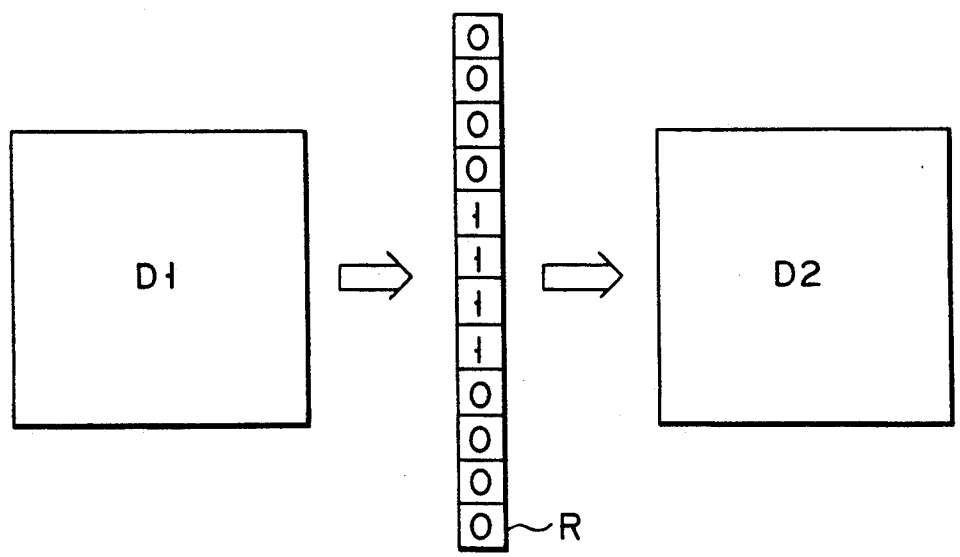
F I G. 22

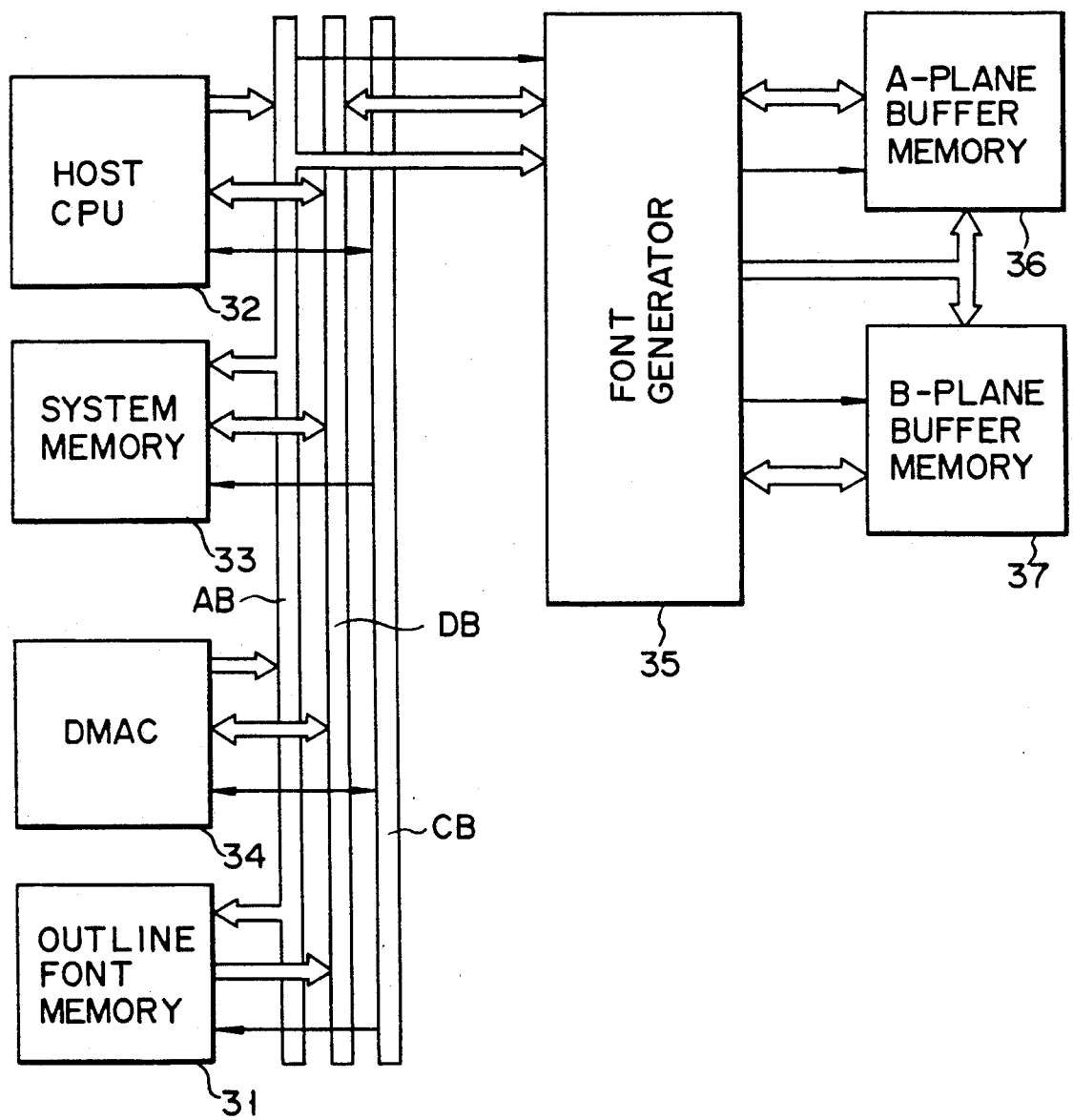
F I G. 24

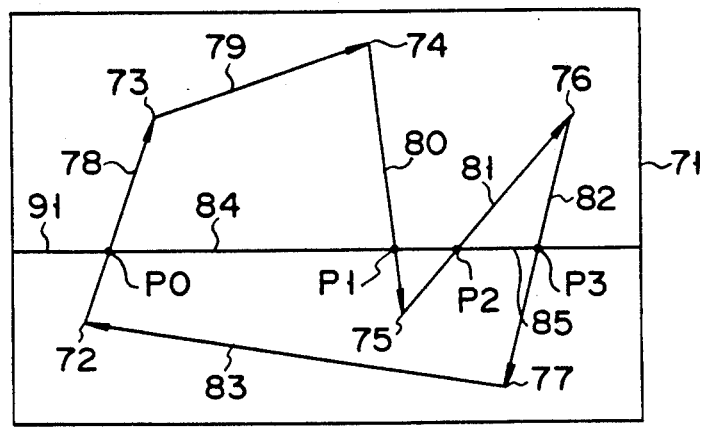
FIG. 26
(PRIOR ART)
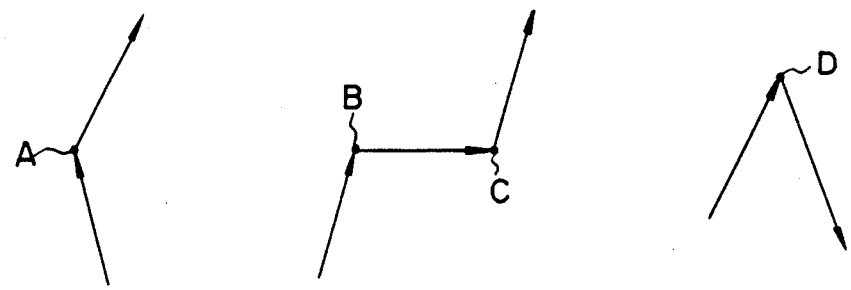
FIG. 27A
(PRIOR ART)
FIG. 27B
(PRIOR ART)
FIG. 27C
(PRIOR ART)
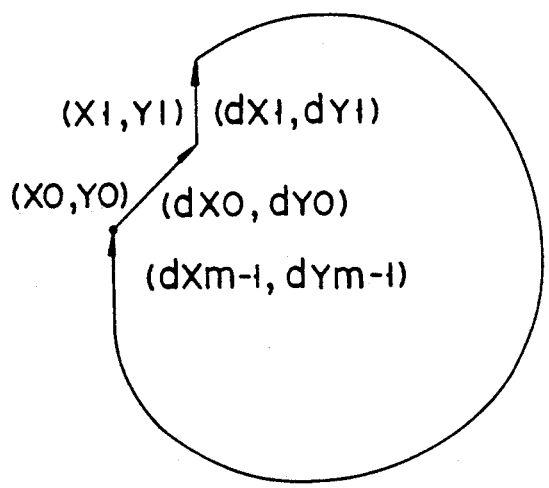
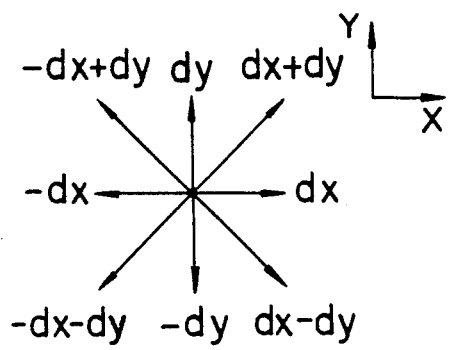
FIG. 28
FIG. 29

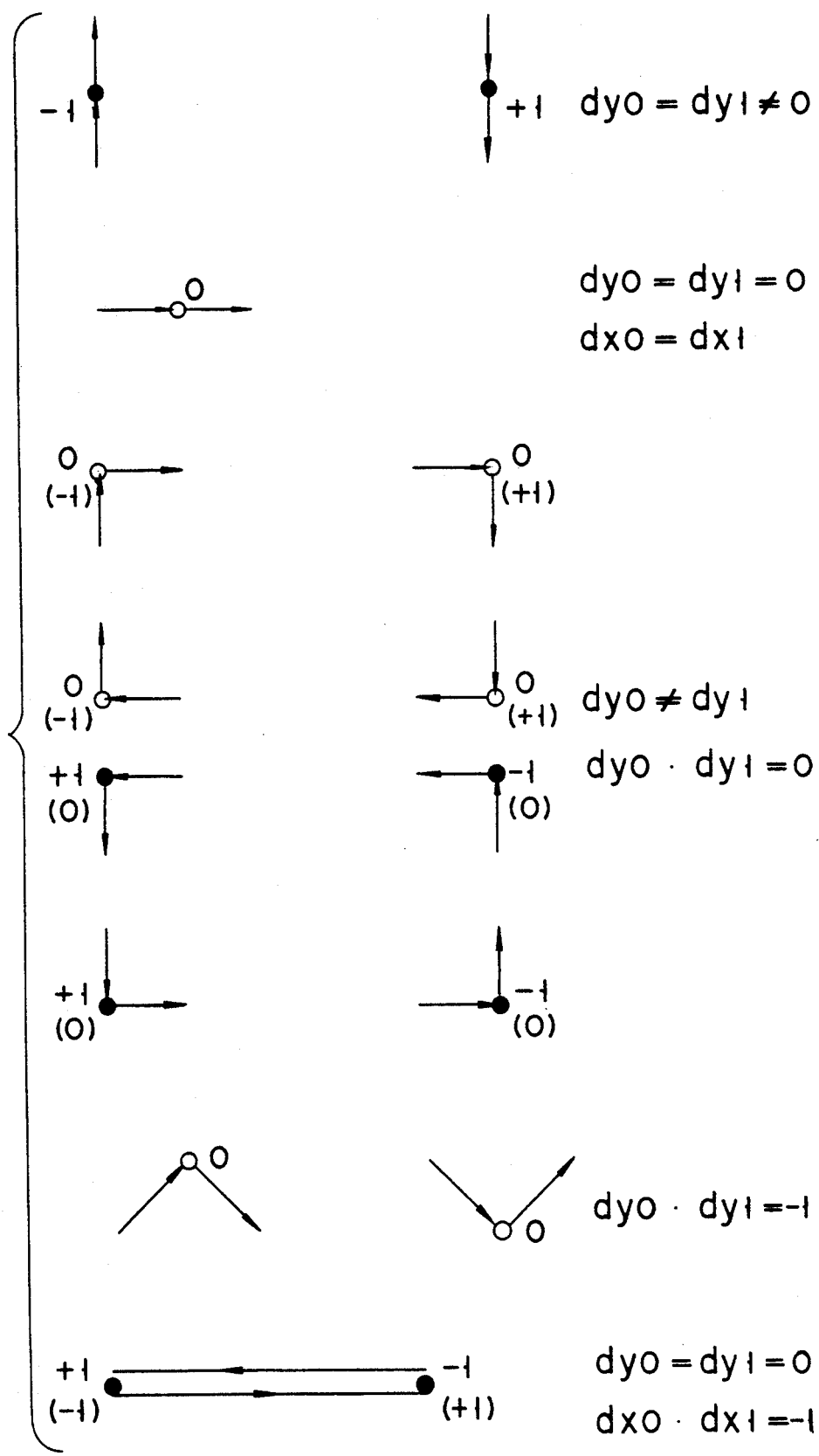
F I G. 32

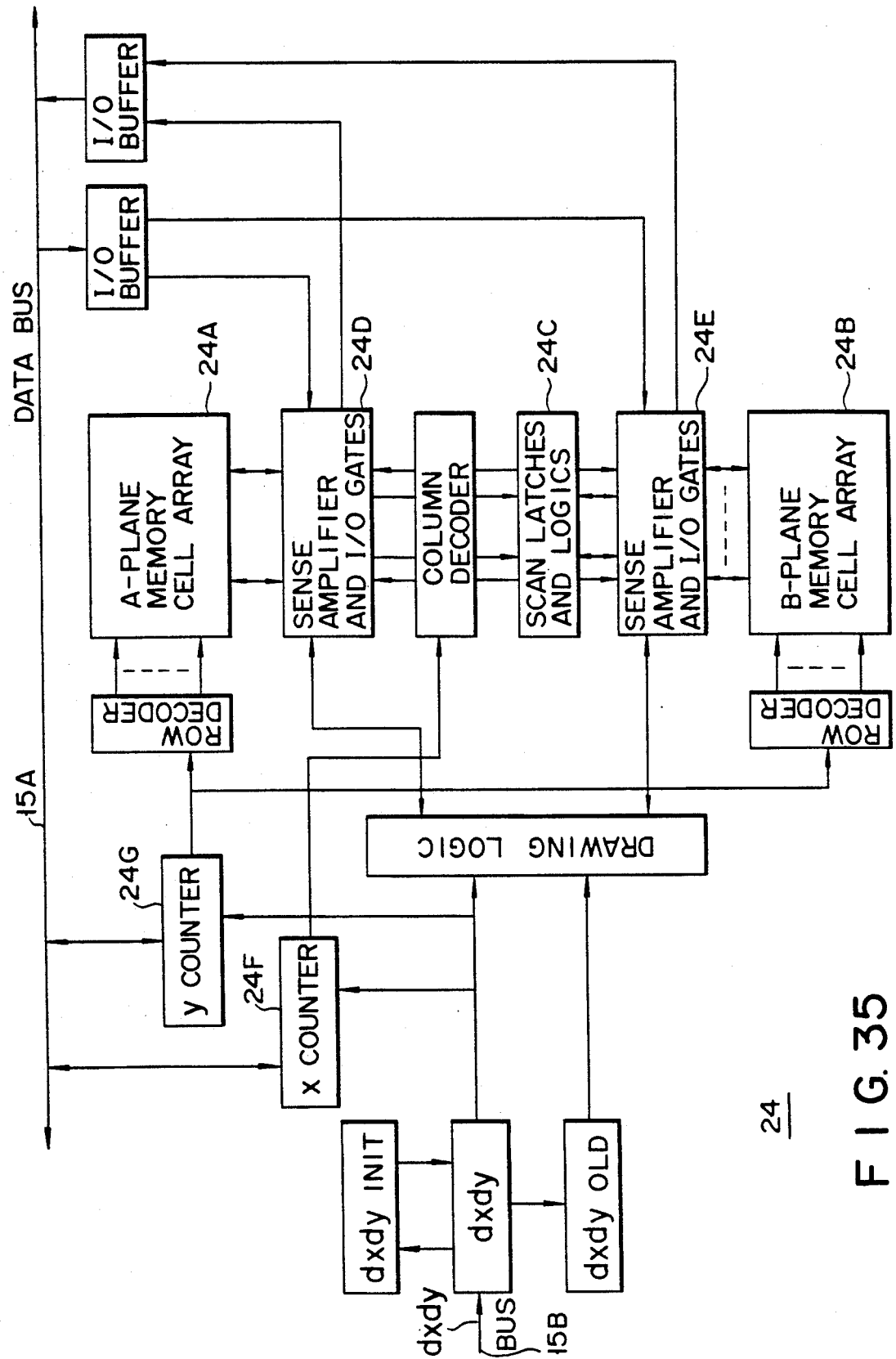
F I G. 35

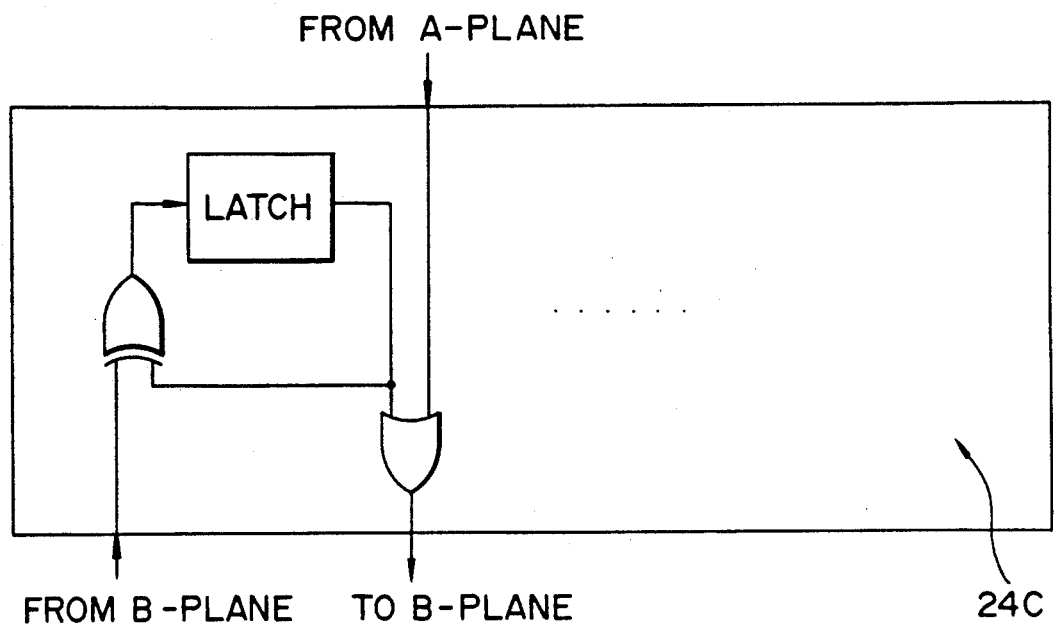
F I G. 36
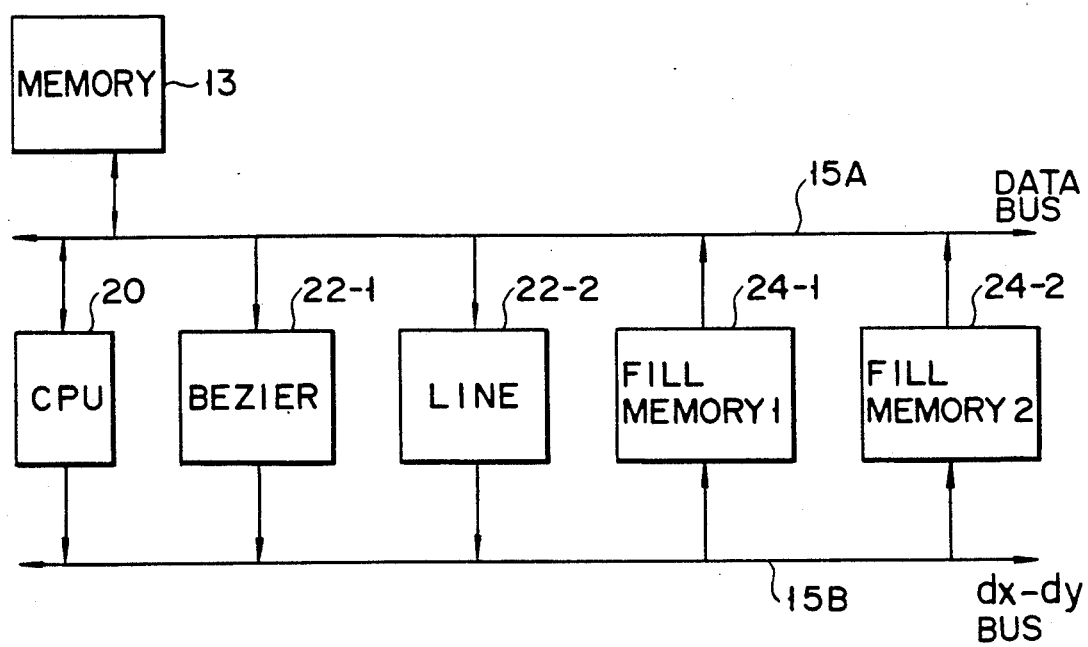
F I G. 37

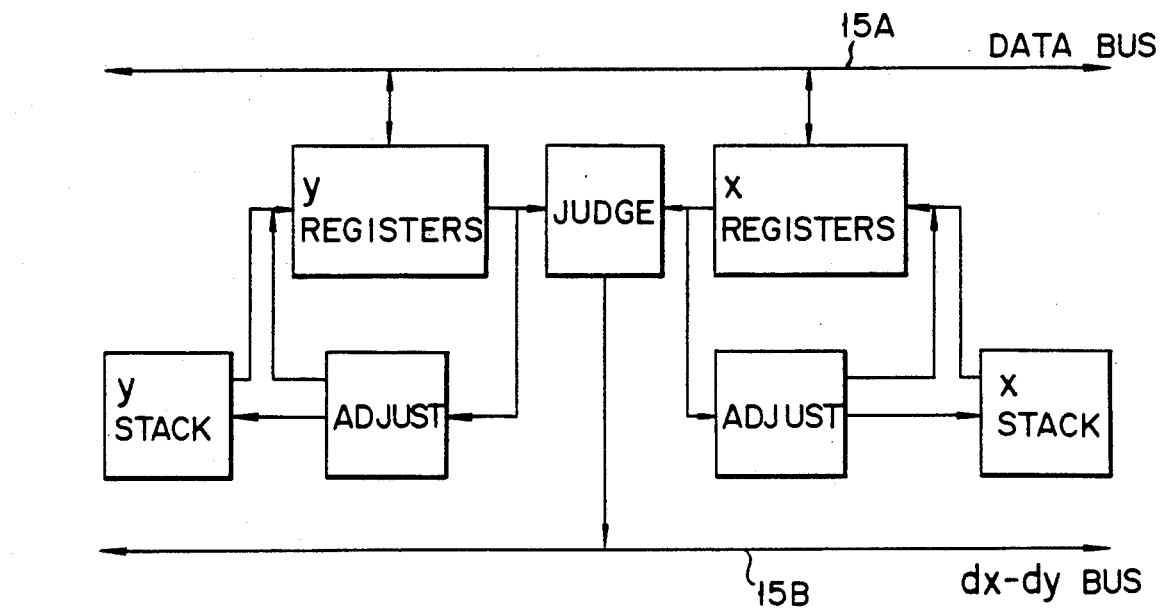
FIG. 38
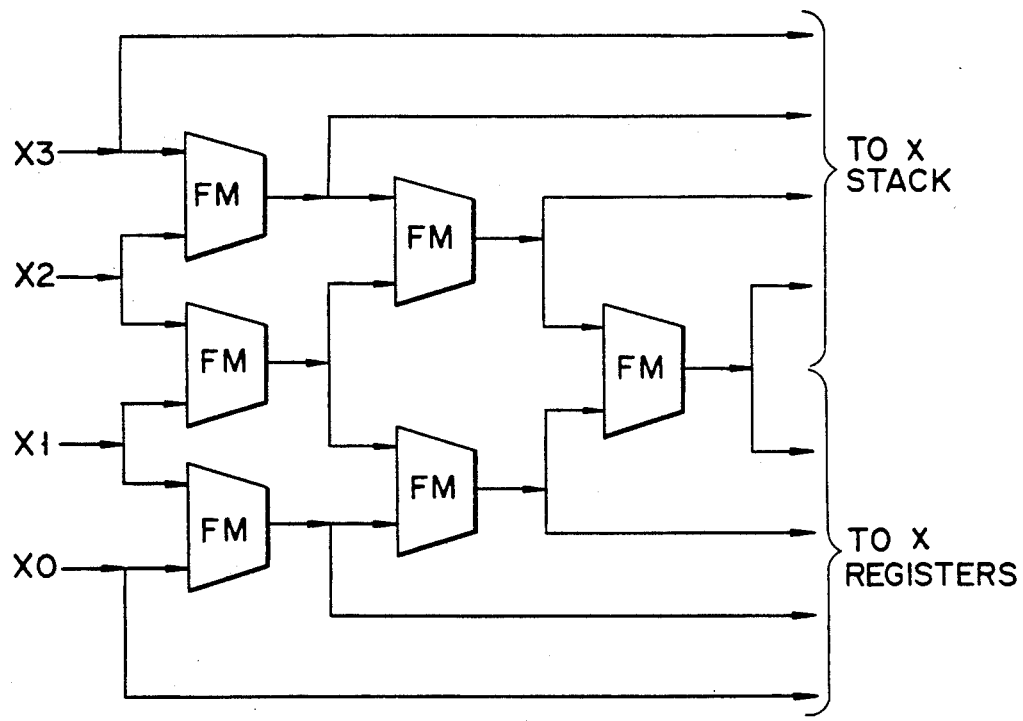
FIG. 39
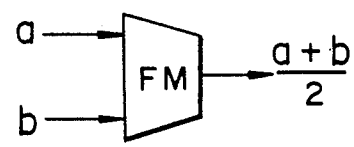

PATTERN DATA GENERATING SYSTEM

BACKGROUND OF THE INVENTION

1. Field of the Invention

The present invention relates to a pattern data generating system for generating pattern data, in which an arbitrary closed graphic pattern whose boundary data is defined on a two-dimensional bit map is filled or painted.

2. Description of the Prior Art

In the field of graphics, it is strongly required to form pattern data by filling or painting an area defined by a polygonal boundary. It is also required to sequentially generate points one by one for an arbitrary curve and to fill or paint a portion surrounded by the curve by using hardware such as DDA (digital differential analyzer).

In a conventional system, in order to satisfy such requirements, filling or painting is performed by using scan conversion for polygons. According to this scan conversion, one direction on a two-dimensional bit map is selected. The selected direction is called a scan direction, and a line parallel thereto is called a scan line. When filling or painting is to be performed, the coordinates of both ends of a line included in a closed graphic pattern are obtained for each scan line, and all the lines in the pattern are painted, thereby filling or painting the overall graphic pattern.

A conventional filling/painting operation of a polygon using scan conversion will now be described, with reference to FIGS. 26 and 27A to 27C. Referring to FIG. 26, reference numeral 71 denotes a rectangular area to be scan-converted; 72 to 77, vertexes of the boundaries of a polygon; 78 to 83, sides of the polygon; and 91, one scan line.

(1) Intersection points P0, P1, P2, and P3 of one scan line 91 and sides of the polygon are obtained. Then, the intersection points are sorted in the order of the coordinate values in the scan direction.

(2) If a given intersection point is an end of a side, i.e., a vertex of the polygon, the given intersection point is processed in accordance with the connection state of the sides of the polygon. In the case shown in FIG. 27A, vertex A is processed as a normal intersection point, while in the case shown in FIG. 27B, one of vertexes B and C is processed as an intersection point. In the case shown in FIG. 27C, vertex D is processed as two intersection points.

(3) The sorted intersection points are paired, and lines having these pairs as their respective ends (lines 84 and 85 in FIG. 26) are filled or painted.

In the conventional system, since processing by software, such as sorting, takes a considerably long period of time, high-speed filling/painting cannot be performed. Further, it is difficult to arrange a hardware system for performing the above processing.

In addition, when lines are to be filled or painted, using a conventional method, vertexes require special processing, as is described in procedure (2). Moreover, if a change in each point of a curve defining an area is generated in a software manner by using a processor, or in a hardware manner by using a DDA or the like, the change in each point need be processed as one line in scan conversion. As a result, a large amount of data must be processed.

As described above, there are various drawbacks to using a conventional system, to fill or paint a closed graphic pattern; for example, high-speed processing cannot be performed, and a hardware system is difficult to arrange.

Meanwhile, the recent availability of high quality low cost printing devices such as laser printers has led to increasing popularity for electronic publishing, and in particular desk top publishing. Electronic publishing typically uses a page description language (PDL) such as PostScript TM. Character patterns are defined by outline data to be filled in, which consists of lines and Bezier curves in the case of PostScript, in order that the high quality of generated character patterns is maintained even when characters are enlarged or rotated.

Generally, bit-map filled pattern generation from outline data consisting of lines and curves is hard work for software processing, and takes a long time. So usually, once the font species (Times-Roman etc.) and size are decided, all character patterns of the font set are generated and stored in font cache, and after that patterns in the cache are used for printing or displaying on a CRT display. This approach can work well for languages using an alphabet.

Conversely, for Japanese, Chinese or other languages containing large sets of ideographs, this does not work well because of the huge character set. For these languages, generating all character patterns at the same time and storing all of them in the cache memory is infeasible due to generation time and storage cost. In such a case, we must generate a character pattern every time the character is required (real time generation) or generate a pattern when the character is first used, and then cache recently used characters. In both cases fast pattern generation is necessary.

Generally, Chinese characters are much more complicated in shape than alphanumeric characters, so especially in the case of small size characters a pixel on a contour may be passed by many other contours or even by other parts of the contour itself. In such cases a poor fill algorithm tends to fail in filling and either causes overflow of the filled region or leaves an interior region unfilled.

Further, some kind of adjustment of the patterns may often be required for small size characters, so it is desired that many possible contour rasterizing algorithms can be applied; this is most easily accomplished by making the filling operation independent of the contour rasterizing algorithm. Our requirements for character pattern generation from outline data are summarized as follows:

<1> High speed fill operation:
This leads to a hardware oriented algorithm and makes a hardware implementation possible.

<2> Correctness of fill operation:
For an outline consisting of an arbitrary number of complicated intersecting contours, correctness of the fill operation must be assured.

<3> Clear division of contour rasterization from fill operation:
This makes the fill operation independent of the contour rasterization algorithm so that character transformations may be easily accomplished, and makes hardware implementation easy.

There have been many filling algorithms (ordered edge list algorithms, edge flag algorithms, seed fill algorithms). Most of them treat polygon fill. A representative one is the classical ordered edge list algorithm ("Newman, W. M. Sproull, R. F., Principles of Interactive Computer Graphics, McGraw-Hill, 1979"), which is one of the fastest algorithms suitable for software processing. However it is difficult to implement into hardware because the algorithm needs sorting operations. In this algorithm contour rasterization and filling operation are tightly coupled.

An edge flag algorithm is easier for hardware implementation but it can't be applied to our dx-dy approach because it also treats real edges in the filling operation.

Seed fill is an algorithm in which contour rasterization and filling operations are completely divided. But this algorithm is inferior in efficiency and has difficult problem of seed point determination.

SUMMARY OF THE INVENTION

The present invention has been developed in consideration of the above situation, and has as its object to provide a pattern data generating system which can perform filling or painting at high speed and can be easily realized by a hardware system.

In order to achieve the above object of the present invention, there is provided a pattern data generating system comprising first and second bit map memories (13A, 13B); first control means (12) for sequentially generating points corresponding to the boundaries of a closed curve in response to changes dx and dy along x and y directions, and writing the points in the first bit map memory (13A); second control means (12) for sequentially generating points, which are required to paint an area enclosed by the closed curve, on the basis of the changes dx and dy, in accordance with a predetermined rule (cf. FIG. 3, 15), and writing the points in the second bit map memory (13B); third control means (12) for, if w (w is a positive integer) points b0, b1, ... , b(w−2), and b(w−1) are present on a single scan line provided that one direction is set to be a scan direction on the second bit map memory (13B), sequentially writing EXOR data of the points b0, b1, ... , b(j−1) (j is not less than 0 and less than w) at positions corresponding to points b(j); and fourth control means (12) for obtaining pattern data by final filling or painting in which an arithmetic operation (e.g., logical OR or logical AND) of data of an arbitrary point in the first bit map memory (13A) with data of a corresponding point in the second bit map memory (13B) which stores the EXOR data is performed.

The second control means generates a point necessary for the filling/painting operation in accordance with the changes dx and dy from a point immediately preceding an arbitrary point and the changes dx and dy to a point immediately after the arbitrary point, or in accordance with the change dy from a point preceding the arbitrary point and the change dy to a point after the arbitrary point.

The fourth control means obtains pattern data by final filling/painting, such that an OR operation of data of the arbitrary point in the first bit map memory with data of the corresponding point in the second bit map memory is performed, or that an AND operation of inverted data of the arbitrary point in the first bit map memory with data of the corresponding point in the second bit map memory is performed.

In addition, the pattern data generating system of the present invention may further comprise means (12) for dividing a closed curve into a plurality of quadrants (D1-D4 in FIG. 21) when the closed curve used for filling or painting exists in an area larger than the memory area of each of the bit map memories (A, B), and data holding means (R in FIG. 22) for holding one-column data of a right end of pattern data of the closed curve in a left quadrant (D1) of two quadrants (D1, D2) adjacent to each other in the scan direction. The above pattern data is obtained by using the first to fourth control means, such that the data held by the data holding means is used as an initial value when the pattern data of the closed curve in the right quadrant (D2) of the two quadrants (D1, D2) adjacent to each other in the scan direction is generated.

According to the pattern data generating system of the present invention, boundary data has a direction defined as a clockwise or counterclockwise direction with respect to an area to be filled or painted. This data is given as the coordinates of a start point of a closed curve and changes dx and dy of each point. In this case, each of changes dx and dy takes any one of +1, −1, and 0.

In order to generate filled or painted pattern data from such data, first and second bit map memories are used, and points corresponding to the boundary of a closed curve are generated from data dx and dy and are written in the first bit map memory. Subsequently, points necessary for filling or painting of an area defined by the closed curve are generated and are written in the second bit map memory. Points written in the first bit map memory are always those on the boundary, whereas points written in the second bit map memory are not necessarily those on the boundary.

When one direction in the second bit map memory is set to be a scan direction and w (w is a positive integer) points consisting of b0, b1, ... , b(w−2), and b(w−1) are present on one scan line after the points are written in the first and second bit map memories in this manner, exclusive OR data of points b0, b1, ... , b(j−1) are sequentially written in second bit map memory locations corresponding to points b(j) (j is 0 or greater and less than w). Then, an arithmetic operation of data of an arbitrary point in the first bit map memory and data of a corresponding point in the second bit map memory which stores the exclusive OR data is performed, thereby obtaining pattern data in which the last painting is performed.

In this case, if an OR operation is performed as the arithmetic operation of the data of the arbitrary point in the first bit map memory and the data of the corresponding point in the second bit map memory, pattern data, in which an area including the boundary of the closed curve is filled or painted, is obtained. If an AND operation of inverted data of the arbitrary point in the first bit map memory and the data of the corresponding point in the second bit map memory is performed, pattern data, in which an area excluding the boundary is filled or painted, is obtained.

Even if a closed curve subjected to filling/painting is present in an area exceeding the capacities of the first and second bit map memories, pattern data can be obtained by dividing the closed curve into a plurality of quadrants.

BRIEF DESCRIPTION OF THE DRAWINGS

FIG. 2 is a block diagram showing an arrangement of hardware for realizing the pattern data generating system of the present invention;

FIG. 3 is a table summarizing rules in the flow chart of FIG. 1;

FIG. 4 is a view showing coordinates for defining the rule;

FIGS. 5 to 9 are views showing states of data used for the purpose of explaining the embodiment;

FIGS. 10 to 13 views showing states of data used for the purpose of explaining the embodiment;

FIGS. 17 to 20 are views showing states of data used for the purpose of explaining the embodiment in FIG. 14;

FIGS. 21 and 22 are views for explaining samples to which the present invention is applied;

FIG. 24 is a block diagram showing an arrangement of an apparatus using the hardware in FIG. 23, to which the present invention is applied;

FIGS. 26 and 27A to 27C are views for explaining a conventional system;

FIG. 28 shows contour information in difference contour approach;

FIG. 29 shows 8 directions of (dx,dy) steps;

FIG. 32 shows rules for calculation of general winding number generators;

FIG. 35 shows block diagram of fill memory;

FIG. 36 shows scan latches and logic block of fill memory;

FIG. 37 shows block diagram of character generation system based on dx-dy bus architecture;

FIG. 38 shows block diagram of Bezier module of character generation system; and FIG. 39 shows adjust logic of Bezier module for subdividing one Bezier curve into two curves.

DETAILED DESCRIPTION OF THE PREFERRED EMBODIMENTS

Figure 1A:
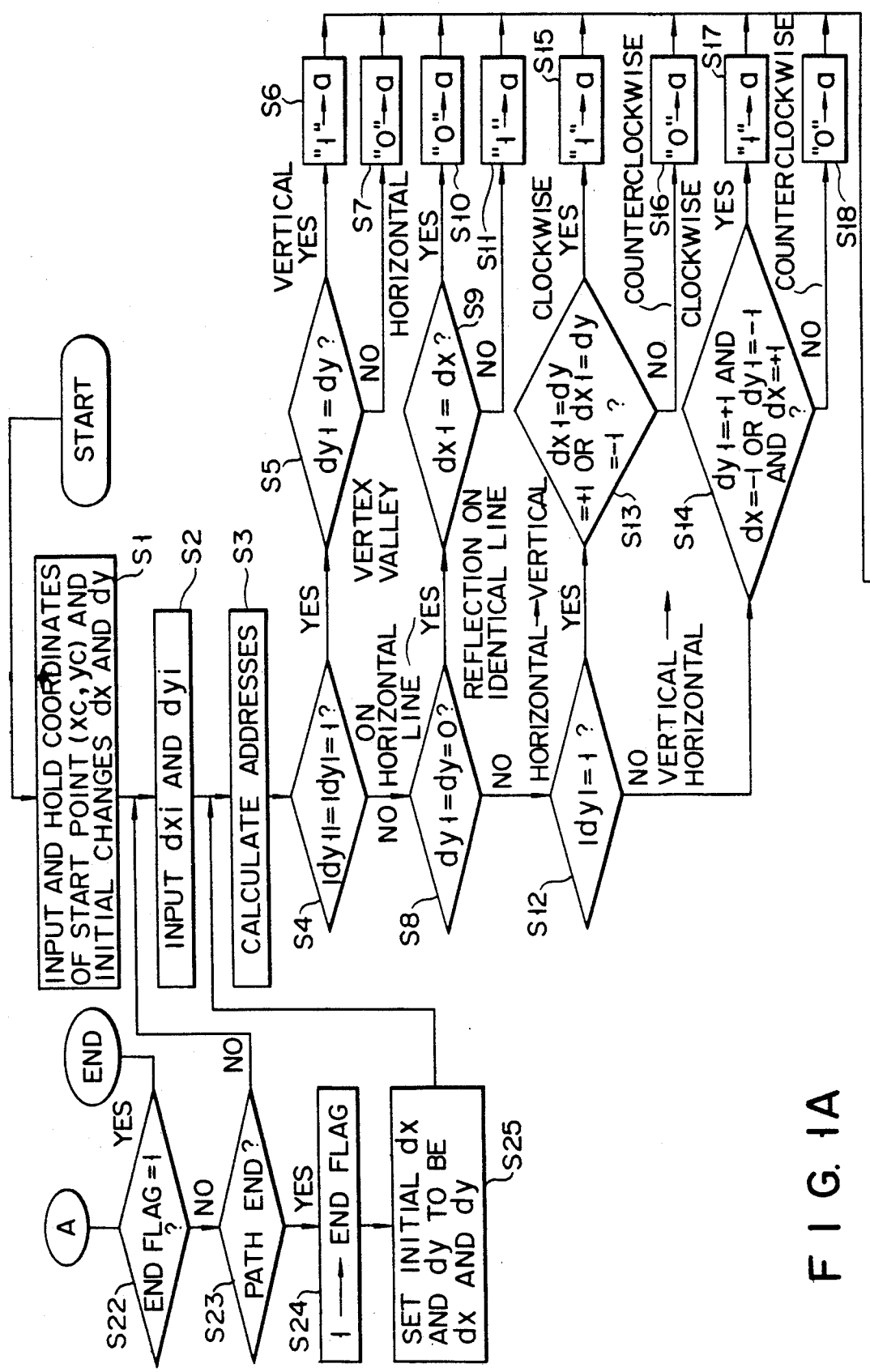
FIG. 1 (FIGS. 1A/1B) is a flow chart for explaining a pattern data generating system according to an embodiment of the present invention.

Embodiments of the present invention will be described below with reference to the accompanying drawings.

FIG. 2 is a block diagram showing an arrangement of hardware used for realizing a pattern data generating system of the present invention. Referring to FIG. 2, reference numeral 11 denotes an input unit including, e.g., a host computer; 13, a memory (fill memory) having two planes, i.e., A and B planes each corresponding to a rectangular area of a two-dimensional bit map; and 14, a display unit. They are connected to each other through bus 15.

When input unit 11 outputs data of a boundary used for filling or painting, it sequentially outputs the x- and y-coordinates of a start point and coordinate changes dx and dy of each point as data of a closed curve having a defined clockwise or counterclockwise direction. Each of changes dx and dy takes any one of +1, −1, and 0.

Processor 12 sequentially outputs points corresponding to the boundary on the basis of data dx and dy described above, and draws the data on the A plane (13A) of memory 13. (This is the function of first control means.) At the same time, processor 12 sequentially outputs points necessary for filling/painting of the closed curve in accordance with predetermined rules, and draws the data on the B plane (13B) of memory 13. (This is the function of second control means.) Changes dx and dy described above can be output from processor 12 in place of input unit 11. In addition, processor 12 performs an arithmetic operation using data of each point on one scan line drawn on the B plane of memory 13, and draws the obtained data on the B plane of memory 13 again. (This is the function of third control means.) Processor 12 generates final filled or painted pattern data by performing an arithmetic operation between the data of the corresponding points on the A and B planes of memory 13. (This is the function of fourth control means.) This pattern data is drawn on, e.g., the B plane of memory 13. However, this data can be drawn in another area of memory 13 or another memory.

The pattern data is transferred to display unit 14. Display unit 14 displays a pattern in which an area defined by the closed curve is filled or painted.

Pattern data is generated by using such hardware in accordance with the following procedures.

Procedure (1): all the data on the A and B planes of memory 13 are cleared to be "0".

Procedure (2): one of points of a polygon of the function to be filled is selected as a start point.

Procedure (3): points on the sides of the polygon are sequentially output clockwise from input unit 11, and changes (dx,dy) from the preceding point are sequentially output. Processor 12 sequentially outputs points to be drawn on the A and B planes in accordance with an algorithm shown in a flow chart in FIG. 1 or 14. The output points are then drawn in memory 13.

Procedure (4): assuming that one scan line on the B plane is constituted by w bits, and bit data of the scan line is given as d0, d1, ... d(w−1)' new data d0', d1', ... d(w−1)' is generated by performing an arithmetic operation represented by equation (1) or (2), as follows, and is drawn on the B plane.

$$\left.\begin{array}{l} d0' \leftarrow d0 \\ d1' \leftarrow d0' \oplus d1 \\ d(w-1)' \leftarrow d(w-2)' \oplus d(w-1) \end{array}\right\} \quad (1)$$

$$\left.\begin{array}{l} d0' \leftarrow d0 \\ d1' \leftarrow \{d0' \oplus d1\} + d0' \\ d(w-1)' \leftarrow \{d(w-2)' \oplus d(w-1)\} + d(w-2)' \end{array}\right\} \quad (2)$$

Procedure 5: OR operation between the corresponding points on the A and B planes, or an AND operation or the like between inverted data of the points on the A plane and data of the corresponding points on the B plane is performed to generate final pattern data.

According to the flow chart in FIG. 1, the x- and y-coordinates (xc,yc) of a first point and initial differences dx and dy are supplied in step S1 (step S will be simply referred to as S1 hereinafter). The coordinates and initial changes dx and dy are held. In S2, succeeding changes dxi and dyi are supplied. The flow advances to S3, and the addresses of a point to be drawn are calculated. The calculations are performed by adding changes dx and dy in the respective direction to x- and y-coordinates xc and yc of the start point. After the addresses are calculated, the flow advances to S4 so as to compare absolute value |dy1| change dy1 in the y direction from the preceding point with respect to the current point with absolute value |dy| of change dy in the y direction from the next point with respect to the current point. If both the values are 1, the flow advances to S5 to check if dy1=dy. If YES is obtained in S5, constant a is set to be "1" in S6. If NO is obtained in S5, constant a is set to be "0" in S7.

If NO is obtained in S4, the flow advances to S8 to check if both dy1 and dy are "0". If YES is obtained in S8, the flow advances to S9 to check if dx1=dx. If YES is obtained in S9, constant a is set to be "0" in S10. If NO is obtained in S9, constant a is set to be "1" in S11. If NO is obtained in S8, the flow advances to S12 to check if dy=1. If YES is obtained in S12, the flow advances to S13. If NO is obtained in S12, the flow advances to S14. In S13, it is checked if both dx1 and dy are +1, or −1. If YES is obtained in S13, constant a is set to be "1" in S15. If NO is obtained in S13, constant a is set to be "0" in S16. In S14, it is checked if dy1 is +1 and dx is −1, or dy1 is −1 and dx is +1. If YES is obtained in S14, constant a is set to be "1" in S17. If NO is obtained in S14, constant a is set to be "0" in S18.

After the values of constants a are set in S6, S7, S10, S11, S15, S16, S17, and S18, the flow advances to S19 and S20. In S19 and S20, drawing is performed on points on the A and B planes of memory 13 corresponding to the coordinates of the addresses calculated in S3. In this case, "1" is drawn on the A plane unconditionally. However, the original data of the coordinates and constant a are EXORed, and the resultant value is drawn on the B plane. Upon completion of drawing on the A and B planes, the flow advances to S21 to set changes dx and dy to changes (dx1,dy1) with respect to the preceding point.

After S21, the flow advances to S22 so as to check if an end flag is set at logic 1. If NO is obtained in S22, the flow advances to S23 so as to check if the end flag is a path end. The path end represents that all changes dx and dy of a closed curve requiring pattern data are supplied. If NO in S23, the flow returns to S2 again so as to perform an input operation of dxi and dyi. If YES is obtained in S23, the flow advances to S24. After the end flag is set at logic 1, the flow advances to S25. In S25, initial changes dx and dy supplied in S1 are set to be changes to the next point with respect to the start point, and then the flow advances to S3.

If it is determined in S22 that the end flag is set at logic 1, the flow advances to S26. In S26, it is checked if the coordinates corresponding to the addresses finally calculated in S3 coincide with the start point. If YES in S26, "Pass" is obtained. If NO in S26, it is determined that the boundary is not closed, and hence error processing "Error" or the like is performed.

Figure 1B:
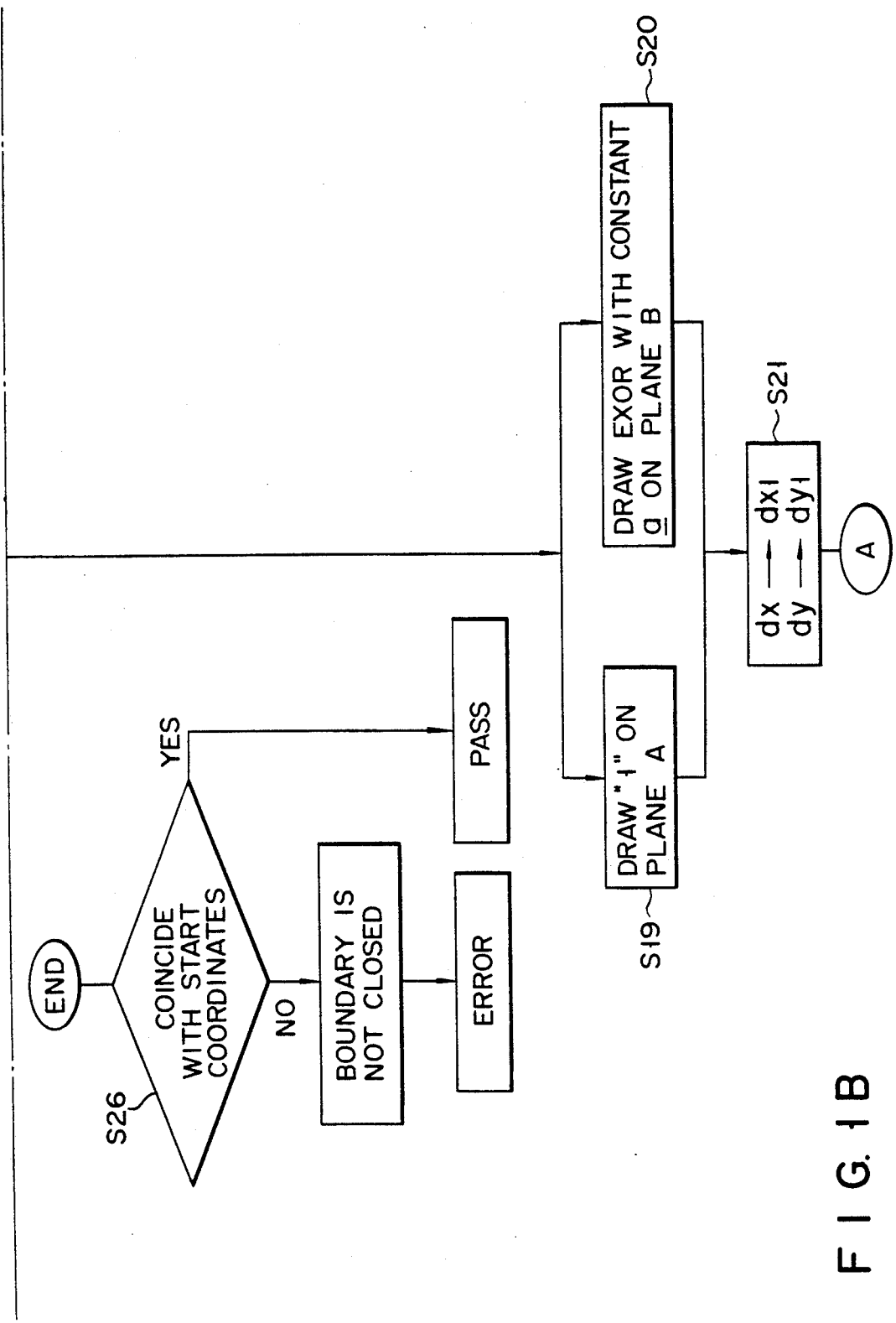

The processing from S4 to S18 in the flow chart of FIG. 1 describes rules for determining constant a used to draw points on the B plane of memory 13. FIG. 3 is a table summarizing these rules. When a drawing area shown in FIG. 4 is taken into consideration, the rightward direction is a direction for increasing x-coordinates, whereas the downward direction is a direction for increasing y-coordinates.

A case wherein filling/painting of a polygon having a boundary shown in, e.g., FIG. 5 is performed in accordance with the above-described procedures will be described below. FIG. 5 shows a graphic pattern obtained by drawing a normal continuous boundary of a polygon, which is subjected to painting, on the A plane on the basis of data of each point. As shown in FIG. 5, the points on the boundary are respectively denoted by Nos. 1 to 33.

All the data on the A and B planes are cleared. If the start point No. is 1, the coordinates (xc,yc) of this point (pixel) and the data (dx,dy) of a point of the next number, i.e., 2 are input (S1 in FIG. 1). At this time, the start point may or may not be drawn on the A plane. In this case, this point is not drawn. Similarly, it is not drawn on the B plane.

Subsequently, the data (dx,dy) of the point of No. 3 is input (S2 in FIG. 1). In this case, changes (dx,dy) in the x and y directions from the point (point No. 1) preceding the point of No. 2 are set to be (dx1,dy1) in advance in S21. Since changes (dx1,dy1) are (−1,0), changes (dx,dy) to the next point with respect to the point of No. 2 in the x and y directions are set to (−1,0). In this case, when the rules in FIG. 3 are applied, the point of No. 2 is present on a horizontal line, and hence constant a is set to "0". Thereafter, the point of No. 2 is unconditionally drawn on the A plane in S19. On the other hand, in S20, EXOR data of the original data ("0" after the clearing operation) of the point of No. 2 with constant a is drawn on the B plane. In this case, since constant a is "0", drawing is not practically performed at the point of No. 2, as shown in a drawing state in FIG. 6.

In order to draw the point of No. 3, the preceding values (dx,dy), which are (−1,0), are set to be (dx1,dy1), and coordinates (dx,dy) for the point of No. 4 are input. In this case, (dx,dy)=(0,1). When the rules in FIG. 3 are applied, since the point of No. 3 is present at a corner, and this corner is present at a position where the boundary bends from the horizontal direction to the vertical direction clockwise, constant is set to "1". Subsequently, the point of No. 3 is unconditionally drawn on the A plane in S19. On the other hand, in S20, EXOR data of the original data of the point of No. 3 with constant a is drawn on the B plane. In this case, since constant a is "1", "1" is drawn at the point of No. 3 on the B plane.

In order to draw the point of No. 4, the preceding values (dx,dy), which are (0,−1), are set to be (dx1,dy1), and coordinates (dx,dy) with respect to the next point, i.e., the point of No. 5, are input. In this case too, (dx,dy)=(0,1). When the rules in FIG. 3 are applied to this state, the point of No. 4 is present on a vertical or oblique line, and hence constant a is set to "1". Thereafter, the point of No. 4 is unconditionally drawn on the A plane, whereas EXOR data of the original data of the point of No. 4 and "1" of constant a, i.e., "1" is drawn on the B plane. The point of No. 5 is then drawn. Since the points of Nos. 5 to 7 have the same conditions as those of the point of No. 4, "1" is drawn at each point on both the A and B planes. Since "1" is always drawn on the A plane, only a drawing operation on the B plane will be described below.

In order to draw the point of No. 8, the preceding values (dx,dy), i.e., (0,−1) are set to be (dx1,dxy1), and (dx,dy) with respect to the next point i.e., the point of No. 9, are input. In this case, (dx,dy)=(+1,0). When the rules in FIG. 3 are applied to this state, since the point of No. 9 is present at a corner where the boundary bends from the vertical direction to the horizontal direction clockwise, constant a is set to "1". As a result, "1" is drawn at the point of No. 8 on the B plane.

"0"s are drawn at the points of Nos. 9 and 10, and "1"s are drawn at the points of Nos. 11 and 12 in the same manner as described above.

In order to draw the point of No. 13, the preceding values (dx,dy), i.e., (0,+1) are set to be (dx1,dy1), and (dx,dy) with respect to the next point, i.e., the point of No. 14, are input. In this case, (dx,dy)=(+1,0). When the rules are applied to this state, since the point of No. 13 is present at a corner where the boundary bends from the vertical direction to the horizontal direction counterclockwise, constant a is set to "0". Therefore, drawing is not practically performed. The succeeding points up to the point of No. 31 are drawn in the same manner as described above. As shown in FIG. 6, "0"s are drawn at the points of Nos. 14 to 16, 19, 20, and 17 to 31, whereas "1"s are drawn at the points of Nos. 17, 18, and 21 to 26.

In order to draw the point of No. 32, the preceding values (dx,dy), i.e., (−1,0) are set to be (dx1,dy1), and (dx,dy) with respect to the next point, i.e., the point of No. 33, are input. In this case, (dx,dy)=(−1,−1). When the rules in FIG. 3 are applied to this state, the point of No. 32 is present at a vertex or a valley, and hence constant a is set to "0". "0" is drawn at the point of No. 32 on the B plane.

In order to draw the point of No. 33, the preceding values (dx,dy), i.e., (−1,−1) are set to be (dx1,dy1), and (dx,dy) with respect to the next point, i.e., the point of No. 1 (start point). are input. In this case, (dx,dy)=(−1,0). When the rules in FIG. 3 are applied to this state, since the point of No. 33 is present at a corner where the boundary bends from the vertical direction to the horizontal direction counterclockwise, constant a is set to "0". As a result, "0" is drawn at the point of No. 33 on the B plane.

In order to draw the point of No. 1, the preceding values (dx,dy), i.e., (−1,0) are set to be (dx1,dy1). Thereafter, if "path end" is determined in S23, (dx,dy) with respect to the next point, i.e., the point of No. 2, held in S1 in advance are set to be changes (dx,dy) to the next point with respect to the start point. In this case, (dx,dy)=(−1,0). When the rules in FIG. 3 are applied to this state, since number 1 is present on the horizontal line, constant a is set to "0". As a result, "0" is drawn at the start point, i.e., the point of No. 1 on the B plane.

In this manner, "1"s are drawn at all the points on the boundary, as shown in FIG. 5, whereas "1"s are drawn at only the required points on the boundary. Note that if the boundary is closed after the start point is drawn, the coordinates of the start point coincide with these of the final point. If they do not coincide with each other, the boundary is not closed, and hence error processing or the like is performed.

Subsequently, the arithmetic operation based on equation (1) or (2) described in aforementioned procedure (4) is performed for each scan line by using data on the B plane show in FIG. 6. The operation results are written on the B plane again. If the arithmetic operation based on equation (1) is performed in this case, data shown in FIG. 7 is obtained. If the arithmetic operation based on equation (2) is performed, data shown in FIG. 9 is obtained. Note that each circle in FIGS. 7 to 9 represents that data at that point is "1".

The arithmetic operations described in the said procedure (5) are then performed between the data on the A plane shown in FIG. 5 and the data on the B plane shown in FIG. 7 or 9. If, for example, the data on the A and B planes are ORed, final pattern data shown in FIG. 8 is generated.

The final pattern data in FIG. 8 may be written on the B plane, or may be transferred to another memory. If the final result is written in a memory other than the A and B planes, and at the same time data of portions on the A and B planes where filling/painting is completed are cleared, then data on the A and B planes are cleared upon completion of the final filling/painting operation. In this case, therefore, a time required for a clearing operation as a preparatory step for drawing and filling/painting operations of the next closed curve can be saved.

When the polygon having the boundary shown in FIG. 5 is to be filled or painted, all the rules shown in FIG. 3 are not applied. A case wherein filling/painting of a closed curve having a boundary shown in FIG. 10 is performed by using rules which are not used in the above description will be described below. Note that FIG. 10 also shows a graphic pattern to be drawn on the A plane, which is obtained by drawing an ordinary continuous boundary of a polygon to be filled or painted on the basis of data of each point. As shown in FIG. 10, points on the boundary are denoted by Nos. 1 to 24.

The closed graphic pattern having the boundary shown in FIG. 10 is characterized in that the points of Nos. 12 and 18, the points of Nos. 13 and 17, the points of Nos. 14 and 16, and the point of No. 15 are not simply present on a horizontal line, but reflection of boundary occurs on the same horizontal line. The reflection point is the point of No. 15. If drawing at this point is performed in accordance with the rule in FIG. 3, (dx1,dy1) with respect to the point of No. 15 become (+1,0), and changes (dx,dy) to the point of No. 16 are (−1,0). This means reflection occurs on the same horizontal line That is, constant a is set to "1" in this case, and "1" is drawn at the point of No. 15 on the B plane, as shown in FIG. 11. Since drawing at other points on the B plane is performed in the same manner as described above, a description thereof will be omitted.

In this manner, "1"s are drawn at all the points on the boundary on the A plane of memory 13, as shown in FIG. 10, whereas "1"s are drawn only at required points on the B plane, as shown in FIG. 11.

Subsequently, the arithmetic operation based on equation (1) or (2) in aforementioned procedure (4) is performed for each scan line. The operation results are drawn on the B plane again. If the arithmetic operation based on equation (1) is performed in this case, data shown in FIG. 12 is obtained. When the OR operation in aforementioned procedure (5) of the data on the A plane shown in FIG. 10 with the data on the B plane shown in FIG. 12 is performed, final pattern data shown in FIG. 13 is generated.

As described above in the above-described embodiment, since sorting of coordinates is not required unlike in the conventional scan conversion system, filling or painting of a closed graphic pattern can be performed at high speed. In addition, filling or painting of any closed graphic pattern, which is drawn with one stroke by using coordinate changes (dx,dy) of each point, can be performed. Furthermore, filling/painting can be accurately performed at any start point of coordinates.

In the above embodiment, the drawing direction of the boundary of a closed graphic pattern is not limited. Therefore, even if drawing directions cross each other as in a case wherein a graphic pattern such as "8" or "∞" is drawn, drawing can be performed. In addition, if filling or painting areas are identical, filling/painting can be performed at a constant speed, regardless of complication of a closed graphic pattern.

Figure 14:
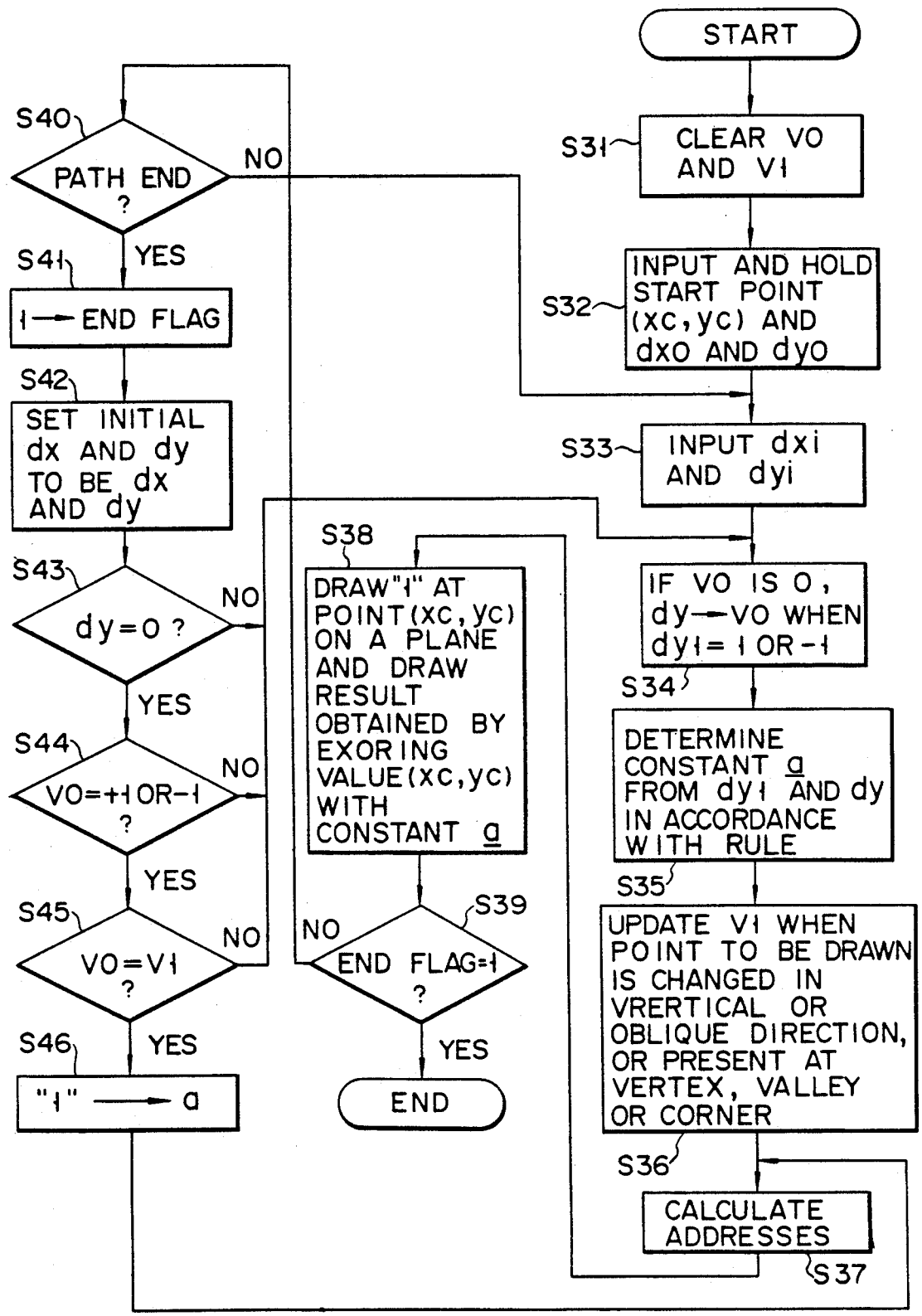
FIG. 14 is a flow chart for explaining a pattern data generating system according to another embodiment of the present invention.

According to a flow chart shown in FIG. 14, internal registers V0 and V1 of processor 12 are cleared in S31. In S32, the x- and y-coordinates (xc,yc) of a start point and dx0 and dy0 as initial changes dx and dy are supplied. The coordinates and initial changes dx and dy are held. In S33, succeeding changes dxi and dyi are input. The flow advances to S34. In S34, the value of V0 is checked. If V0 is 0, and dy1 is +1 or −1, value dy is set in V0. Subsequently, the flow advances to S35, constant a, with which the EXOR of data at a current point is performed, is determined from values dy1 and dy on the basis of predetermined rules. The flow advances to S36. In S36, value dy is checked. If it is changed to −1 or +1, the changed value is set in V1.

Note that value dy is changed to −1 or +1, when a point to be drawn is changed in a vertical or oblique direction, or is present at a vertex, a valley, or a corner.

The flow advances to S37 to calculate the address of a pixel. This calculation is performed by adding changes dx and dy in the respective directions to the x- and y-coordinates (xc,yc) of the start point. Upon completion of the address calculations, the flow advances to S38. In S38, drawing is performed at points on the A and B planes corresponding to the coordinates of the addresses calculated in S37. In this case, "1" is unconditionally drawn on the A plane, whereas EXOR data of the original data of the coordinates with constant a is drawn on the B plane.

After the data are drawn on the A and B planes, dx and dy are set to be changes (dx1,dy1) with respect to the preceding point. Thereafter, the flow advances to S39 to check if the end flag is set at logic "1". If NO is obtained in S39, the flow advances to S40 so as to check if it is "path end". If NO is obtained in S40, the flow returns to S33 again to input dxi and dyi. If YES is obtained in S40, the flow advances to S42 after the end flag is set at logic "1" in S41. In S42, (dx0,dy0) initially input in S32 are set to be changes (dx,dy) to the next point with respect to the start point. Then, the flow advances to S43 so as to check if dy is 0. If YES is obtained in S43, the flow advances to S44 so as to check if V0 is +1 or −1. If YES is obtained in S44, the flow advances to S45 so as to check if V0=V1. If YES is obtained, constant a is set to "1" in S46. Thereafter, the flow advances to S37.

If NO is obtained in each of S43, S44, and S45, the flow advances to S34.

If YES is obtained in S39, it is checked if the coordinates corresponding to the address finally calculated in S37 coincide with those of the start point. If they coincide with each other, "Pass" is obtained. If they do not coincide with each other, it is determined that the boundary is not closed, and error processing "Error" is performed.

Figures 15, 16A, 16B:
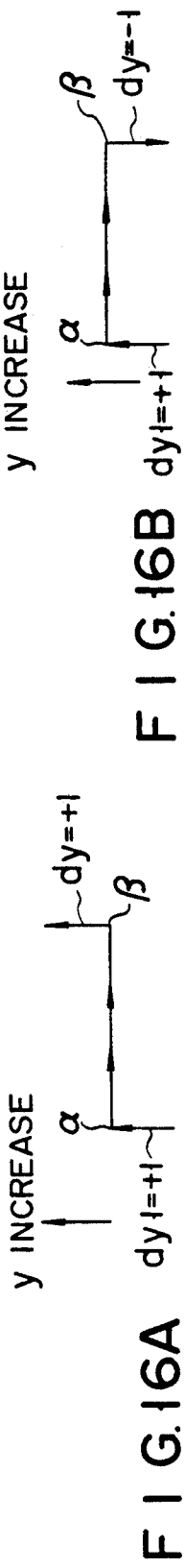
FIG. 15 is a table summarizing rules in the flow chart of FIG. 14.
FIGS. 16A and 16B are views for explaining some of the rules.

In S35 in the flow chart of FIG. 14, constant a, which is used to draw a point on the B plane of memory 13, is determined. FIG. 15 shows a table summarizing rules for determining this constant. In this case, as shown in FIG. 16, an x-coordinate value is increased/decreased in the same direction as in FIG. 4, whereas a y-coordinate value is increased/decreased in a direction opposite to that in FIG. 4.

In FIG. 15, "Comparison" when a pixel is present at a corner where a boundary is changed from the horizontal direction to the vertical direction or an oblique direction means that a newest value at the preceding pixel at the time when dy1 is changed to +1 or −1 is compared with dy at a current pixel. Constant a is determined on the basis of this comparison result. For example, as shown in FIG. 16A, when dy1 is +1 both at preceding point α and current point β, constant a is set to "1". If dy1 at preceding point α is +1, and is −1 at current point β, as shown in FIG. 16B, constant a is set to "0".

A case wherein filling or painting of a closed graphic pattern having a boundary shown in FIG. 17 is performed in accordance with the above-described procedure will be described below. FIG. 17 shows a graphic pattern to be drawn on the A plane, which is obtained by drawing a normal continuous boundary of a closed graphic pattern to be filled or painted on the basis of data of each point. As shown in FIG. 17, points on the boundary are denoted by Nos. 1 to 21.

All the data on the A and B planes, and registers V0 and V1 are cleared. Then, the coordinates (xc,yc) of start point, i.e., the point of No. 1, and data (dx,dy), i.e., (0,+1) for the next point, i.e., the point of No. 2, are input (S32 in FIG. 14). At this time, data is drawn on neither the A nor B planes.

Data (dx,dy)=(0,+1) for the point of No. 3 with respect to the point of No. 2 are input (S33 in FIG. 14). In this case, V0=0, changes (dx,dy) from the preceding point (the point of No. 1) to the point of No. 2 in the x and y directions are set to be (dx1,dy1), and dy1=+1. Therefore, +1 is set in V0 (S34).

At the point of No. 2, dy1=dy=+1. When the rules in FIG. 15 are applied to this state, since the point of No. 2 is present on a vertical or oblique line, constant a is set to "1". Thereafter, "1" is unconditionally drawn at the point of No. 2 on the A plane as shown in FIG. 17, whereas EXOR data "1" of the original data of the point of No. 2 ("0" after the clearing operation) with constant a is drawn on the B plane (S38).

In order to draw the point of No. 3, preceding values (dx,dy), i.e., (0,+1) are set to be (dx1,dy1), and (dx,dy) for the next point, i.e., the point of No. 4, are input. In this case, (dx,dy)=(0,+1), and this state is equivalent to that of the point of No. 2. Therefore, "1" is unconditionally drawn at the point of No. 3 on the A plane as shown in FIG. 17, and "1" is drawn at the point of No. 3 on the B plane as shown in FIG. 18.

In order to draw the point of No. 4, preceding values (dx,dy), i.e., (0,+1) are set to be (dx1,dy1), and (dx,dy)=(+1,0) for the next point, i.e., the point of No. 5, are input. In this case, dy1=+1 and dy=0. When the rules in FIG. 15 are applied to this state, since the point of No. 4 is present at a corner where the boundary is changed from the vertical direction or an oblique direction to the horizontal direction, constant a is set to "0". Subsequently, "1" is unconditionally drawn on the A plane as shown in FIG. 17. On the other hand, EXOR data "0" of the original data at the point of No. 4 with constant a is drawn on the B plane. However, this point is not practically drawn on the B plane, as shown in FIG. 18. Since "1" is always drawn on the A plane, a description of this operation will be omitted hereinafter.

In order to draw the point of No. 5, preceding values (dx,dy), i.e., (+1,0) are set to be (dx1,dy1), and (dx,dy)=(+1,0) for the next point, i.e., the point of No. 6, are input. In this case, dy1=dy=0. When the rules in FIG. 15 are applied to this state, since the point of No. 5 is present on a horizontal line, constant a is set to "0". As a result, the point of No. 5 is not drawn on the B plane.

In order to draw the point of No. 6, preceding values (dx,dy), i.e., (+1,0) are set to be (dx1,dy1), and (dx,dy)=(0,+1) for the next point, i.e., the point of No. 7, are input. In this case, dy1=0 and dy=+1. When the rules in FIG. 15 are applied to this state, the point of No. 6 is present at a corner where the boundary is changed from the horizontal direction to the vertical direction or an oblique direction. As a result, newest value dy of the values at the points preceding the current point, which is +1 or −1, (in this case, dy at the point of No. 4) is compared with change dy to the point of No. 7. Since both of them are +1 in this case, and hence coincide with each other, constant a is set to "1". As a result, the point of No. 6 is drawn on the B plane.

In order to draw the point of No. 7, preceding values (dx,dy), i.e., (0,+1) are set to be (dx1,dy1), and (dx,dy)=(0,+1) for the next point, i.e., the point of No. 8, are input. In this case, dy1=dy=+1. When the rules in FIG. 15 are applied to this state, since the point of No. 7 is present on a vertical or oblique line, constant a is set to "1", and "1" is drawn at the point of No. 7 on the B plane.

After drawing of points up to the point of No. 20 is completed in the same manner as described above, preceding values (dx,dy), i.e., (−1,0) are set to be (dx1, dy1) so as to draw data at the point of No. 1 (or No. 21). Thereafter, if "path end" is determined in S40 in the flow chart of FIG. 14, (dx,dy) for the point of No. 2, which are held in S32 in advance, are set to be (dx,dy) for the next point with respect to the start point. In this case, (dx,dy)=(+1,0). When the rules in FIG. 15 are applied to this state, since the point of No. 1 is present at a corner where the boundary is changed from the horizontal direction to the vertical direction or an oblique direction, values dy are compared with each other in the above-described manner. In this case, the values do not coincide with each other, and hence constant a is set to "0". As a result, no data is drawn on the B plane.

In this manner, "1"s are drawn at all the points on the boundary on the A plane (13A) of memory 13 as shown in FIG. 5, whereas "1"s are drawn only at required points on the boundary on the B plane (13B) as shown in FIG. 6. Note that the processing in S42 to S46 in the flow chart in FIG. 14 is performed to draw start points, and that the processing in S46 is performed only when the points of Nos. 4 and 5 in FIG. 17 are start points.

Subsequently, the arithmetic operation based on equation (1) or (2) in aforementioned procedure (4) is performed for each scan line by using the data on the B plane shown in FIG. 18. The operation result is then written on the B plane. FIG. 19 shows the result from the arithmetic operations based on equation (1).

Thereafter, the arithmetic operation in aforementioned procedure (5) is performed between the data on the A plane shown in FIG. 17 and the data on the B plane shown in FIG. 19. If, for example, the data on the A and B planes are ORed, final filled or painted pattern data, as is shown in FIG. 20, is generated.

As described above, according to this embodiment, sort processing (software) is not required unlike in the conventional system. Therefore, even when the processing is performed using software, the processing amount of the software can be decreased, and high-speed processing can be realized. In addition, filling or painting of any closed graphic pattern can be performed, as long as it is drawn with one stroke by using coordinate changes (dx,dy) of each point. Painting can be performed at any start point of coordinates. Furthermore, the drawing direction of the boundary of a closed graphic pattern is not limited. Therefore, even if drawing directions cross each other, as in a case of "8" or "∞", drawing of such a graphic pattern can be performed. Moreover, identical filling/painting areas can be painted at a constant speed regardless of complication of a closed graphic pattern.

In the above embodiment, a closed graphic pattern is stored within the rectangular area of the two-dimensional bit map corresponding to the A and B planes (13A, 13B) of memory 13. In practice, however, a closed graphic pattern is sometimes present in an area larger than the rectangular area described above.

An application of the present invention wherein painting of such a large closed graphic pattern is performed will be described below.

Assume that a closed graphic pattern to be filled or painted corresponds to four times the rectangular area of the A or B plane of memory 13, as shown in FIG. 21. If this large closed graphic pattern i divided into four quadrants D1 to D4, and filling or painting is performed independently for each quadrant, an accurate result cannot be obtained. If, for example, a scan line of each quadrant is set in the x direction, closed graphic pattern F1 which is present across quadrants D1 and D2 becomes a non-closed graphic pattern in quadrant D2 due to the division.

In such a case, the large closed graphic pattern is divided into quadrants D1 to D4. This division is performed by input unit 11 in the hardware arrangement shown in FIG. 2. Pattern data in which filling/painting is performed as described in aforementioned procedures (1) to (5) is generated in quadrant D1. Of the pattern data in quadrant D1 generated in this case, one-column data of the right end is stored in register R (or memory areas other than the A and B planes of memory 13), as is shown in FIG. 22. When pattern data after painting in accordance with aforementioned procedures (1) to (5) is to be generated in quadrant D2 adjacent to quadrant D1 in the scan direction, the one-column data of the right end in quadrant D1 stored in register R (or in areas of memory 13) is used as initial data. Similarly, after completing the filling or painting in accordance with aforementioned procedures (1) to (5), pattern data is generated in quadrant D3. One-column data of the right end of the pattern data in quadrant D3 generated at this time is used as initial data when pattern data in quadrant D4 is to be generated.

As described above, even if filling or painting of a large closed graphic pattern is performed in each divided quadrant, filling or painting in right adjacent quadrants in the scan direction can be accurately performed.

Figure 23:
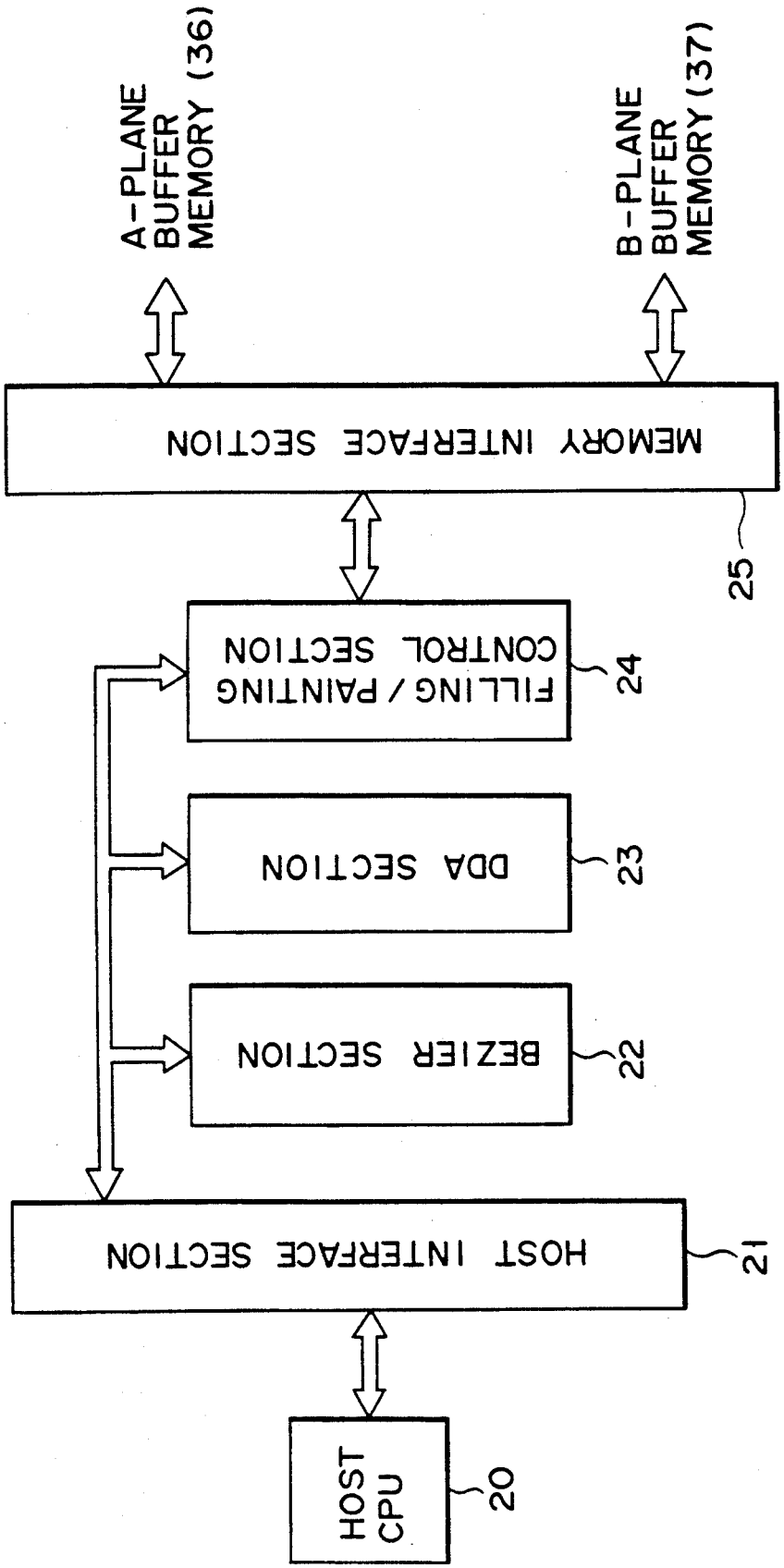
FIG. 23 is a block diagram showing an arrangement of hardware exclusively used for the pattern data generating system of the present invention.

FIG. 23 is a block diagram showing a hardware arrangement exclusively used for the pattern data generating system of the present invention. This hardware comprises host interface section 21, Bezier section 22, DDA section 23, painting control section 24, and memory interface section 25.

Host interface section 21 controls data transfer between host CPU 20 and internal blocks. Host CPU 20 accesses, via host interface section 21, control registers in each block of Bezier section 22, DDA section 23, filling/painting control section 24, or the A and B planes of buffer memories (fill memory) connected to memory interface section 25.

Bezier section 22 generates quantized data (dx,dy) curve-approximated from four data constituted by two points outside a boundary as well as two points on the boundary designated by host CPU 20. Bezier section 22 is suitably used for generation of high-quality boundary data having many curves.

DDA section 23 generates quantized data (dx,dy) linearly approximated from two data on a boundary designated by host CPU 20. DDA section 23 is suitable for generation of boundary data of a line, a circle, an ellipse, and the like.

Filling/painting control section 24 generates pattern data by executing the said procedures (1) to (5), and mainly has the following two functions:

(i) drawing points of a boundary on the pair of A- and B-plane buffer memories on the basis of changes (dx,dy) in the x and y directions generated by Bezier section 22, DDA section 23, or host CPU 20. In this case, all the points of the boundary based on (dx,dy) are drawn on the A-plane buffer memory, as described above. On the B-plane buffer memory, only required points are drawn in accordance with the rules shown in FIG. 3 or FIG. 15.

(ii) filling or painting an area defined by the boundary which is drawn by function (i). This processing is performed by using data in the A and B-plane buffer memories. The resultant data is written in the B-plane buffer memory or transferred to host CPU 20.

Memory interface section 25 controls data transfer between filling/painting control section 24 and the A- and B-plane buffer memories.

As described above, according to the pattern data generating system of the present invention, a hardware arrangement can be easily realized by a simple combination of circuits.

FIG. 24 is a block diagram showing an arrangement of an apparatus using the hardware shown in FIG. 23, to which the present invention is applied. This apparatus is mounted in a word processor or the like, and serves to perform filling or painting of fonts stored in outline font memory 31. In addition to outline font memory 31, the apparatus comprises host CPU 32, system memory 33, direct memory access controller (DMAC) 34, font generator 35 having the same arrangement as that of the hardware in FIG. 23, A- and B-plane buffer memories 36 and 37, address bus AD, data bus DB, and control bus CB.

Outline font memory 31 stores boundary data for designating Bezier section 22 and DDA section 23 (both of which are shown in FIG. 23) in font generator 35.

DMAC 34 performs high speed control of data obtained upon filling or painting by font generator 35, or performs high speed control of data transfer between A- and β-plane buffer memories 36 and 37, and system memory 33.

Figure 25A:
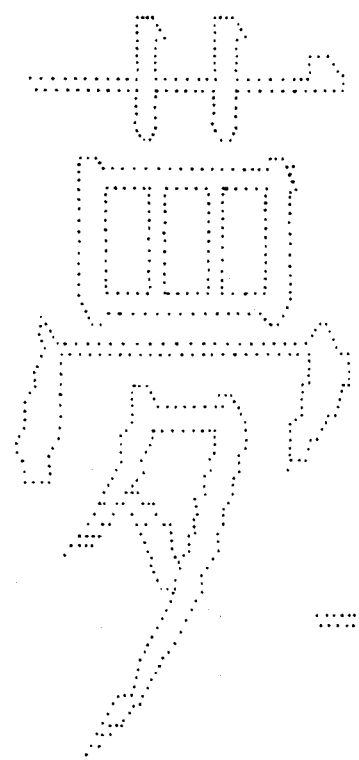
FIGS. 25A to 25C show results of painting of a Chinese or Japanese character "YUME" (dream) by using the apparatus in FIG. 24.
Figure 25B:
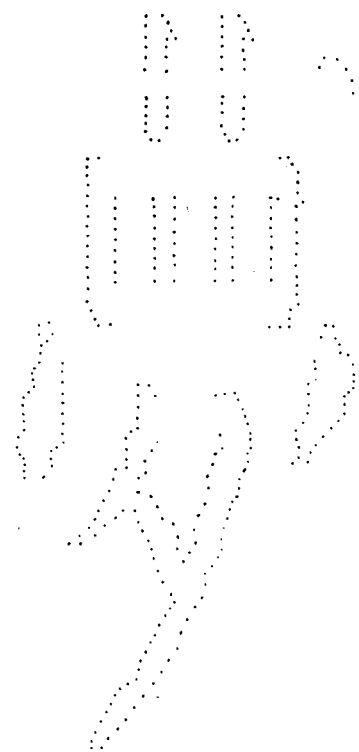
Figure 25C:
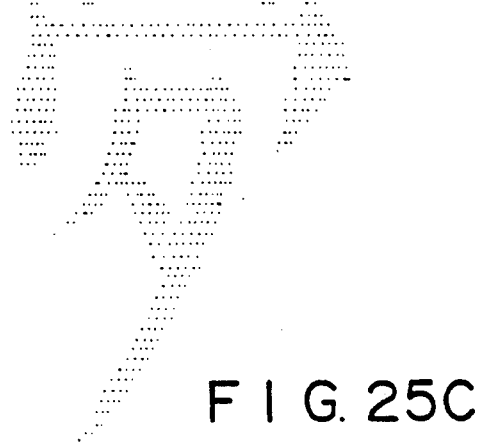

FIGS. 25A to 25C show results in filling or painting of a Chinese character "" using the apparatus in FIG. 24 in accordance with the algorithm shown in the flow chart in FIG. 1. FIG. 25A shows a result drawn on A-plane buffer memory 36. FIG. 25B shows a result drawn on B-plane buffer memory 37. FIG. 25C shows a result obtained by performing the logical OR of the contents of A-plane buffer memory 36 and the result obtained by filling/painting the contents of B-plane buffer memory 37.

By using this apparatus, filling or painting of a complicated graphic pattern such as a font can be performed at high speed.

The present invention is not limited to the abovedescribed embodiments. Various changes and modifications can be made. For example, when a final result is obtained by performing a logical operation of the data on the A plane shown in FIG. 5 with the data on the B plane shown in FIG. 6 or 7, the data on the A and B planes are ORed to perform filling/painting including the original boundary, as is shown in FIG. 8. However, if the inverted data on the A plane and the data on the B plane are ANDed, filling or painting without the original boundary can be performed.

In the embodiments, changes (dx,dy) of each point are supplied clockwise. However, the system may be designed such that changes (dx,dy) are supplied counterclockwise.

Furthermore, in the above embodiments, the scan direction in filling/painting is set to be the x direction. However, scanning can be performed in the y direction by replacing dx1 and dx with dy1 and dy, respectively. By this replacement, the terms of current pixel positions in FIG. 3 are changed from "horizontal" to "vertical", and from "vertex or valley" to "both ends", respectively.

As has been described above, according to the present invention, since sorting of coordinate values is not required unlike in the conventional scan conversion system, high-speed filling or painting of a closed graphic pattern can be realized, and a hardware arrangement can be realized by a simple combination of circuits. In addition, filling or painting of any closed graphic pattern can be performed as long as it is drawn with one stroke by using coordinate changes (dx,dy) of each point. Moreover, filling or painting can be performed at any start point of coordinates.

In the present invention, the drawing direction of the boundary of a closed graphic pattern is not limited. Therefore, even if drawing directions cross each other as in a case wherein "8" or "∞" is drawn, drawing can be performed. In addition, identical filling/painting areas can be filled or painted at a constant speed regardless of complication of a closed graphic pattern.

A new fill (or paint) algorithm called Difference Contour Fill algorithm (DCF algorithm) which generates a filled (or painted) pattern from contour information is introduced in this invention. It is a kind of scan line sweep method suitable for high speed hardware implementation. It ensures independence of fill/paint operation from contour rasterization. Correctness of DCF algorithm is also described later.

First of al, fill pattern generation based on the new DCF algorithm can be divided into two phases of operations;

(a) contour rasterization,
(b) fill or paint operation.

In the first phase (a), a real outline in continuous 2-dimensional space is rasterized and the following interface information is generated. A filled pattern is generated using only this information in the second phase. Interface information between these two phases of operations is a set of rasterized contour information, which has the form, $$\text{start address } (x0, y0) \quad (3)$$

$$\left.\begin{array}{l} (dx0, dy0) \\ (dx1, dy1) \\ (dxm - 1, dym - 1) \end{array}\right\}$$

loop-end, where $(x0,y0)$ is a start point of a contour, and $(dxi,dyi)$ $(i=0, \ldots, m-1)$ are the differences of coordinates of two contiguous points on that contours as shown in FIG. 28. These $(dxi,dyi)$ must satisfy the following constraints (FIG. 29).

$$\left.\begin{array}{l} dxi = 0, \pm 1 \\ dyi = 0, \pm 1 \\ |dxi| + |dyi| \neq 0 \end{array}\right\} \quad (4)$$

$$\sum_{i=0}^{m-1} dxi = \sum_{i=0}^{m-1} dyi = 0 \text{ (closed loop condition)} \quad (5)$$

"Loop-end" is a signal indicating the contour ended by the last $(dx,dy)$. This signal is necessary for closing loop processing in the second phase operation.

Figures 30A, 30B, 30C, 30D:
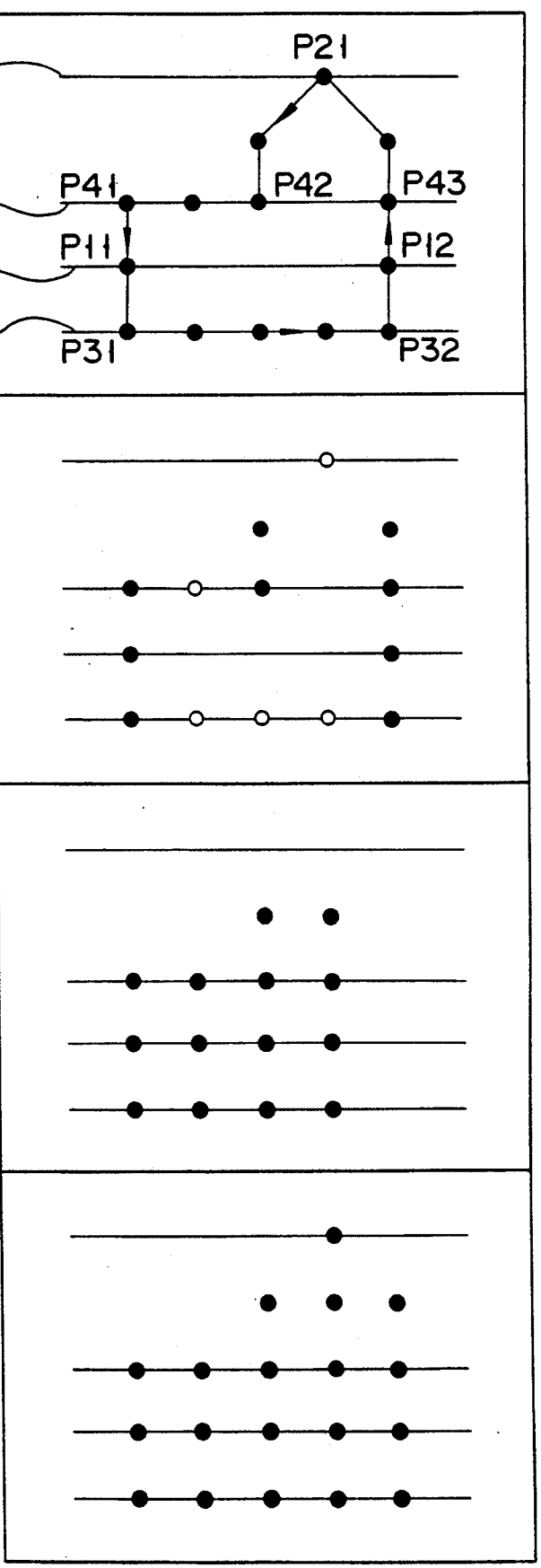
FIGS. 30A-30D show fill or paint operation using DCF algorithm for a simple case.

Now we describe the basic idea of DCF algorithm for the simple example in FIG. 30. The contours to be filled are drawn in FIG. 30A and a filled pattern are drawn in FIG. 30D. As for the scan line L1, points from P11 to P12 should be painted. This can be done by the following steps. First, P11 and P12 are marked as contour points in A-plane and as flag points in B-plane. Next, data on the scan line in B-plane are taken XOR operation successively from left to right along the scan line (scan line sweep). All points from P11 to P12 but P12 are painted by this step, as shown in FIG. 30C. Finally, when this data on B-plane is OR operated with contour data in A plane, the correct fill pattern on the scan line L1 is obtained as shown in FIG. 30D. There must be an even number of flag points on the scan line so that the operation of the scan line sweep makes no overflow. Therefore, for cases such as the scan line L2 including a peak point like P21 of the contour, or the scan line L3 or L4 including horizontal steps of the contour, special treatments are required.

More specifically, as for L2, P21 is not marked on B-plane in the above marking step, and no point is painted in scan line sweep operation, but final OR operation will make P1 painted. As for L3, only P31 and P32 of the contour points are marked on B-plane so that a correct filled pattern is generated by the same way as L1. As for L4, only P41 and P43 are marked and P42 is not marked in the marking step.

The essential point of DCF algorithm is stated as follows.

Scan line sweep operation can be performed rapidly, but makes incomplete filed pattern in general. The complete fill pattern can be obtained by taking OR of this incomplete pattern and contour data.

The second essential point is that: we can determine only by the incoming step $(dx0,dy0)$ and outgoing step $(dx1,dy1)$ whether a contour point $(x,y)$ is marked or not.

Figure 31:
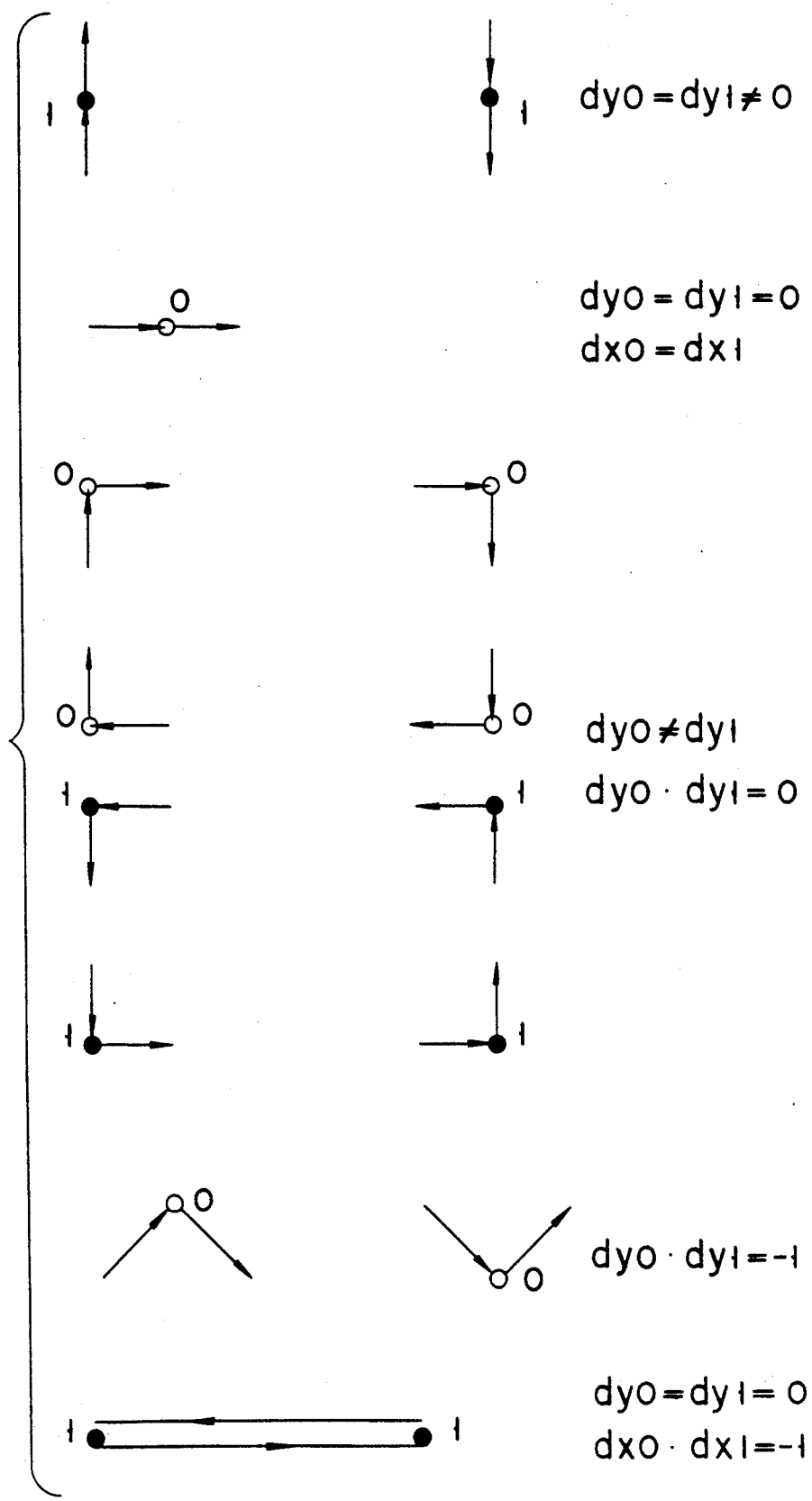
FIG. 31 shows rules for marking on B-plane in DCF algorithm.

The rule for this determination is described in FIG. 31. In FIG. 31 a black bullet (written as 1) means a point to be marked, and a white bullet (written as 0) means a point not to be marked. For example, if both dy0 and dy1 are $+1$ or $-1$, then the point $(x,y)$ must be marked, if both dy0 and dy1 are 0, then the point is not marked, and so on. The second feature is a great merit for our approach where outline data is defined by difference contour (eq. (3)).

The DCF algorithm generating a fill pattern from contour information (eq. (3)) consists of two stages of operation. The first stage is for contour generation on bit may memory from a set of above-mentioned contour information, and the second stage is for scan line sweep and taking OR operation. All points on a rasterized outline are generated in A plane and flags for scan line sweep marked in B plane in the first stage by tracing $(dx,dy)$ step vectors along contours, and a complete filled pattern is generated in B plane in the second stage. DCF algorithm is described as follows.

First stage:
  FOR each loop DO
  BEGIN
    set start point address to x,y
    FOR each (dx,dy) step of the loop DO
    BEGIN
      IF first step THEN
        store (dx,dy) for the end of the loop
      ELSE BEGIN
        set (x,y) of A-plane to 1
        IF the value of (x,y) defined by FIG. 31
        with current and last (dx,dy) THEN
        complement (x,y) value of B-plane
        change (x,y) by (dx,dy)
      END
      store (dx,dy) for the next step
    END
    set (x,y) of the A-plane to 1
    IF the value of (x,y) defined by FIG. 30
    with start and last (dx,dy) THEN
      complement (x,y) value of the B-plane
    END
Second stage:
  FOR each scan line (with y)
  BEGIN
    w[0] := b[0][y]
    b[0][y] := w[0] or a[0][y]
    FOR each dot on the scan line from left to
    right DO
    BEGIN
      w[x] := w[x−1] XOR b[x][y] : scan line sweep
      b[x][y] := w[x] OR a[x][y] : taking OR
    END
  END As for correctness of DCF algorithm, it is easily clarified that this algorithm gives correct filled pattern for a single simple contour (here "simple" means that a contour pass one point only once). For many nonsimple contours cases, however, the verification of the correctness is not a trivial work. In the next section, it is verified that DCF algorithm gives the correct filled pattern in general case under the even-odd rule.

Exact calculation of winding number is sufficient for determining each point to be filled or not. If winding number is calculated we can adopt non-zero winding number rule or even-odd rule or any other rules to determine region to be filled. For the calculation of winding number, we introduce general winding number $w_{xy}$ which is defined for all raster points $(x,y)$ and is dependent on scan line selection, although winding number $wn_{xy}$ is not defined for points on contours and is independent of scan line selection.

We assign general winding number $w_{xy}$, in the case of only one contour, following conditions.

$$w_{xy} = wn_{xy}, \text{ if } (xy) \text{ is not a contour point.} \quad (6)$$

We also introduce general winding number generator $g_{iy}$ by $$w_{xy} = \sum_{i=0}^{x} g_{iy} \quad (7)$$

$g_{xy}$ has a non-zero value only if (x,y) is a contour point, because of the equation (6). So if we can calculate $g_{xy}$ from the contour information (eq. (3)), we can obtain $w_{xy}$ by equation (7), therefore winding number $wn_{xy}$ for non-contour points.

In the case of many contours, sum of general winding number of each single contour.

$$w_{xy} = \sum_{contour} w_{xy}^{contour}, \quad (8)$$

coincides the winding number for points none of contours pass over $$w_{xy} = wn_{xy} = \sum_{contour} wn_{xy}^{contour} \quad (9)$$

and generated from sum of each generator $$w_{xy} = \sum_{contour} \left( \sum_{i=0}^{x} g_{iy} \right), \quad (10)$$
$$= \sum_{i=0}^{x} \left( \sum_{contour} g_{iy}^{contour} \right)$$

Then we search $g_{xy}$ satisfying equations (6) and (7). There are many candidates. But there are only two solutions, if we adopt another condition that $g_{xy}$ is derived from the single step (dx0,dy0) incoming to the point (x,y), and the single step (dx0,dy0) outgoing from the point In FIG. 32 the rule to assign $g_{xy}$ to the point (x,y) is described. The $g_{xy}$ values (1, −1 or 0) are assigned for all possible combinations of (dx0,dy0) and (dx1,dy1) for one rule, and the values for the other rule is shown in parentheses for each point when they are different. Then it must be verified that the rule given by FIG. 32 is correct.

Figure 34:
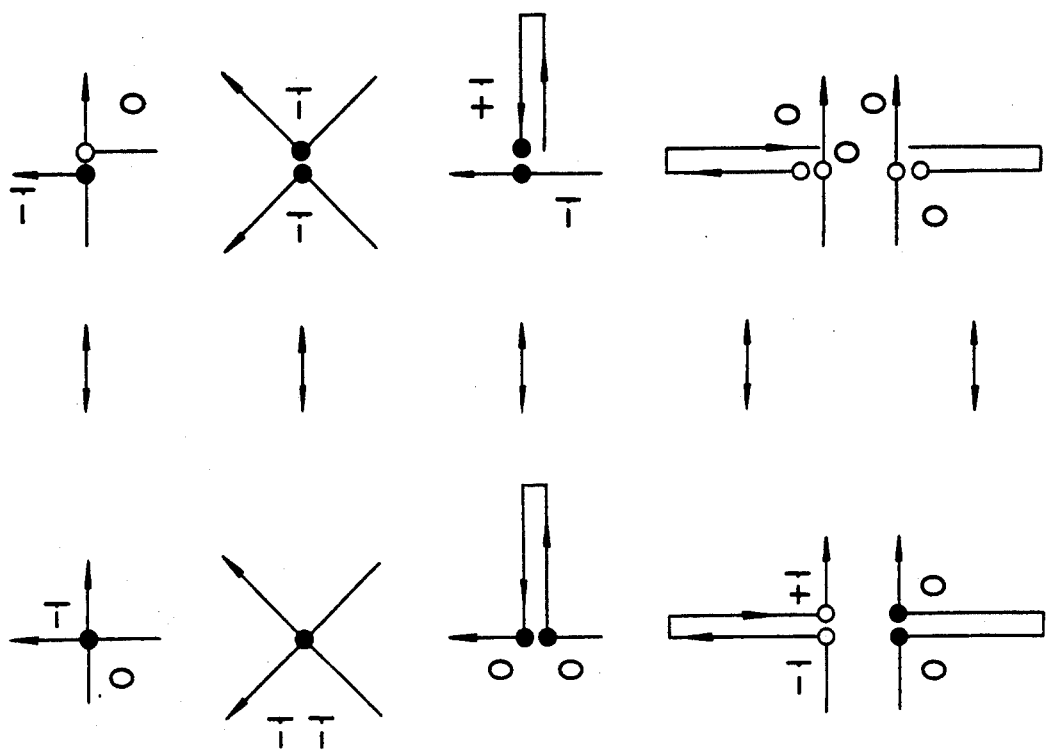
FIG. 34 shows invariance of general winding number through decomposition of contours.
Figure 33:
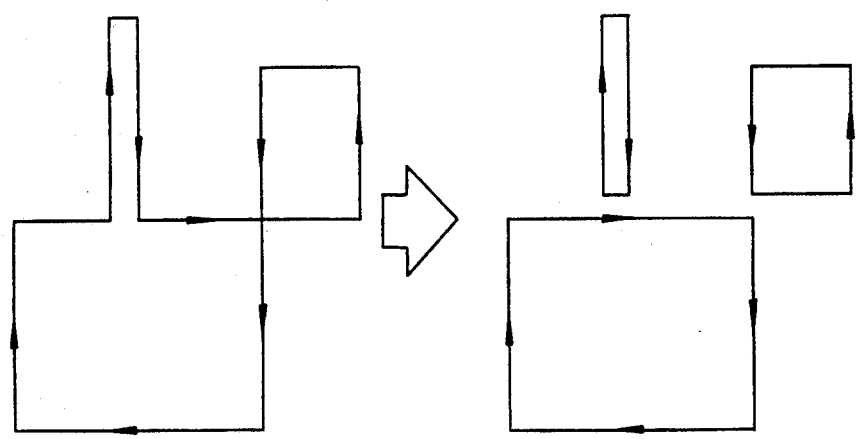
FIG. 33 shows decomposition of a single complex contour into two simple and one degenerated contours.

First, an outline may be classified into following cases.
single simple contour
single degenerated contour
single complex contour
plural contours If the rule gives correct answer for the case of a single contour, then we can get correct answers for plural contours by equation (10). For a single simple contour case the correctness can be checked directly. For a degenerated contour, that is a contour without interior part, the correctness can be checked similarly. A single complex contour can be decomposed into plural simple contours and degenerated contours as shown in FIG. 33. If sum of the general winding number generator $g_{xy}$ of one point is invariant through this decomposition process, it can be said that the correctness of the rule is verified. As the invariance is shown in FIG. 34, the rule in FIG. 32 is correct.

Summarizing the above discussion,
1. calculate extended winding number generator with the rule in FIG. 32, which is assured to be correct, for each contour,
2. then take a sum of extending winding number generator over all contours,
3. calculate extended winding number from its generator derived above.
4. This gives correct winding number for non-contour points.

If we adopt even-odd rule, then only LSB of $w_{xy}$ is interesting and only LSB is important in intermediate calculation. In this case summation is reduced to XOR (exclusive or), rules in FIG. 32 to those in FIG. 30, and calculation of in equation (10) to the scan line sweep operation.

Finally points on contours must be treated properly. If we want to generate patterns including contour points, it can be obtained by OR operation of result of scan line sweep and contours. And this corresponds to the aforementioned DCF algorithm.

Fill memory 24, which corresponds to filling/painting control section 24 in FIG. 23, plays an essential role in DCF algorithm. The block diagram of an implementation of Fill memory 24 is shown in FIG. 35. This memory has two planes of memory cell array 24A, 24B, in which row and column correspond to y and x directions respectively. Scan latches and logics block (SLL block) 24C can be an array of a latch and simple logic circuits, as is shown in FIG. 36. The array lies between two arrays of sense amplifiers 24D, 24E of A and B memory cell array 24A, 24B for the fast fill operation based on scan line sweep. Tow up-down counters 24F, 24G store x and y addresses which are set to start addresses through data bus 15A initially and increment or decrement depending dx and dy values received from dx-dy bus 15B.

This memory has three different operation modes as follows.
1. dx-dy mode:
Fill memory 24 receives dx and dy values from dx-dy bus 15B, accesses pair of cells corresponding x and y addresses on A and B planes in the read modify write mode, and renews x and y values. This mode corresponds to the first stage of DCF algorithm.
2. scan mode:
The y address is incremented successively for the scan line sweep operation. The memory contents of one row of B plane and latches in the SLL block are changed through the function of the SLL block simultaneously in each memory cycle. The function of a bit-slice of the SLL block is described as follows, where A and B are corresponding bits of A and B planes.
latch:=latch XOR B
B:=A OR latch
This mode corresponds to the second stage of DCF algorithm.
3. parallel I/O mode:
Generated pattern can be read out through data bus using this mode.

The scan mode is the key of this implementation, and using this mode scan operation for 1000×1000 array can be performed in 1000 memory cycles, which corresponds to order of 100 nsec filling operation.

By dividing pattern generation into the contour rasterization and fill operation, and by utilizing the simple contour difference data (dx,dy) as bus (dx-dy bus) data among hardware resources, a pattern generating system based on the algorithm of this invention can be constructed effectively. The dx-dy bus 15B is a special lightly-burdened data bus with contour difference data of small bit size (for example 4 bit). As is independent of general data bus, fill pattern generation through-put increases. Each hardware resource including CPU can generate rasterized (dx,dy) data from segment (line, arc and several curves etc.) of a contour. This architecture enables configuration of several dedicated hardwares, fill dedicated memory sub system and CPU which rasterizes by software processing.

As an example, a character generation system based on dx-dy bus architecture and suitable for especially PostScript TM font is shown in FIG. 37. This system has two dx-dy generation modules, Bezier 22-1 and Line 22-2. Contour data, which can be treated in this system, consists of many segments each of which is Bezier curve or line. This system also has two fill dedicated memory modules 24-1, 24-2, which enables double buffering. Using double buffering, during generated filled font pattern on the fill memory 24-1 is read out through data bus 15A to system memory 13, printer frame buffer memory or CRT video buffer, it can generates a new front pattern on the fill memory 24-2.

There are several algorithms for generating Bezier curves or in general cubic curves. Here a simple recursive subdivision algorithm was adopted. This module consists of 4 kinds of 7 submodules, (FIG. 38).

x(y) registers contain 4 reference points of Bezier curve, adjust logic subdivide one Bezier curve to two, (FIG. 39)

x(y) stack, store sets of reference points generated by subdivision, judge block judges if the curve stored in x(y) registers is reduced to a single dx-dy step.

The algorithm is rather straightforward one.

```
Clear stack
Push reference points
WHILE stack not empty DO
BEGIN
  pop to registers
  WHILE contents of registers not reduced to a
  step DO
  BEGIN
    subdivide
    push one of the results
    store another of the results to registers
  END
  output dx,dy
END
```

This system is simulated by simulator written by C language on an Engineering Work Station (EWS), and the generated pattern is printed out by a 300 dpi laser printer.

The source data of Japanese "YUME" character meaning dream is presented in PostScript program format (FIG. 39). Each function module FM in FIG. 39 converts the two input data a and b into (a+b)/2. The font data is defined in a 1000x1000 box and generated data to 1000x1000 box in device coordinates. For rough estimation of performance, machine cycle (=100 μsec) is common to all blocks and memory cycle for the said 1 and 2 modes is the same as machine cycle. For Bezier generation one step of dx-dy takes 2 machine cycle on an average because the same number of push (and pop) operation is necessary as generated dx-dy steps.

The performance of this system for the character generating the "YUME" character (FIG. 25) is summarized in Table 1. Results for three cases of generating a large size (1000x1000) character, a medium size (100x100) character and generating many (100) characters of medium size characters simultaneously are shown in Table 1.

TABLE 1

Performance Evaluation of Character Generation System

| | Line steps & time | Bezier steps & time | Scan steps & time | Total time |
|---|---|---|---|---|
| 1000 × 1000 dot | 4500 | 2674 | 1000 | |
| 1 character | 450 μsec | 535 μsec | 100 μsec | 1085 μsec |
| 100 × 100 dot | 448 | 264 | 100 | |
| 1 character | 45 μsec | 52 μsec | 10 μsec | 107 μsec |
| 100 × 100 dot | 44800 | 26400 | 1000 | |
| 100 characters | 4480 μsec | 5280 μsec | 100 μsec | 9860 μsec |

Key features of this system are (1) the new DCF filling algorithm, (2) the dedicated memory sub system used for the filling operation and (3) the dx-dy bus architecture. This new system is very effective for high-speed generation of high quality characters in applications such as desk top publishing.

The new filling algorithm based on a set of contour information is essential to this system. Correctness of this algorithm is verified by introducing the general winding number, which guarantees the fill operation will be error free. The algorithm requires 2 planes of bit-map memory, and operates in two states: contour generation and scan line sweep.

The dedicated memory subsystem based on the above algorithm for fill operation enables extremely fast scan line sweep operation.

The dx-dy bus architecture consists of the dx-dy bus, CPU, hardware resources generating the (dx,dy) data and fill memory. The simple bus interface makes the hardware implementation easy. This architecture also assures that the fill operation is independent of the contour rasterization algorithm, which makes it possible to easily adjust patterns for small characters. We have presented a sample system implementation. It includes a Bezier curve generation module and a Line generation module with double buffered fill memory in the dx-dy architecture. This system is effective for PostScript TM font description, and is suitable for VLS1 implementation. The inclusion of the fill memory into the same chip with Bezier module and Line module yields especially high performance. The implementation of these blocks on one VLS1 chip, including the Fill logic circuit, has already started.

Simulation and performance evaluation of this system have been done on a workstation. Bezier curve generation and fill operation for a Japanese character font have been simulated and evaluated for various character sizes. The two or three orders of magnitude higher system performance to be obtained from a VLS1 implementation over the current software approach assures real time pattern generation.

Note that there are following Japanese Patent Applications which can be used with the present invention:

(1) Japanese Patent Application No. 63-20316, filed on Jan. 30, 1988; and (2) Japanese Patent Application No. 63-20317, filed on Jan. 30, 1988.

The inventors of the present invention are identical to the inventors of the above Japanese Patent Applications, and these Japanese Patent Applications will also be filed at U.S. Patent Office. All disclosures of the above Japanese Patent Applications and the corresponding U.S. Patent Applications are now incorporated in the specification of the present invention.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A pattern data generating system wherein an area on a two-dimensional bit map plane enclosed by a closed curve defined by a given start point and points subsequent to the start point, is filled or painted, a position of each of the points being determined by individual x- and y-coordinates defined on said two-dimensional bit map plane, the system comprising:
   first and second bit map memories;
   first control means for generating the subsequent points based on the coordinates of the start point and on changes dx and dy, where dx and dy are the differences of the x- and y-coordinates of pairs of adjacent points, which pairs are contained in the group consisting of the start point and the subsequent points, and writing the start point and the generated subsequent points in said first bit map memory;
   second control means for selecting points from a group comprising the start point and the subsequent points, and writing the selected points in said second bit map memory, said selected points being located on memory scan lines defined in said second bit map memory;
   third control means for, if w points b0, b1, ..., b(w−2), and b(w−1) are present on one of the scan lines in said second bit map memory, performing exclusive ORed operation on data of j points b0, b1, ..., b(j−1) selected from the w points, and writing the exclusive ORed data of the j points in said second bit map memory, where each of said w and j is a positive integer (w less than or equal to 1; j less than or equal to 1); and
   fourth control means for performing a predetermined arithmetic operation on data of each point in said first bit map memory with the exclusive ORed data of the point in said second bit map memory, corresponding to the point in said first bit map memory, to obtain a filled or painted area of said closed curve.

2. A system according to claim 1, wherein said second control means includes means for generating each of the selected points in accordance with the changes dx and dy from an immediately preceding point and other changes dx and dy to an immediately subsequent point.

3. A system according to claim 1 wherein said second control means comprises means for generating the selected points in accordance with the change dy from an immediately preceding point and the change dy to an immediately subsequent point when the change dy from the immediately preceding point is a value other than 0 and when the change dy to the immediately subsequent point is a value other than 0.

4. A system according to claim 1, wherein said fourth control means includes means for obtaining pattern data corresponding to the filled or painted area, by ORed operation of data of a point stored in said first bit map memory with data of a corresponding point stored in said second bit map memory.

5. A system according to claim 1, further comprising:
   means for dividing the closed curve into a plurality of regions if the size of the area enclosed by the closed curve exceeds the memory capacity of at least one of said first and second bit map memories.

6. A pattern data generating system wherein an area on a two-dimensional bit map plane, enclosed by a closed curve defined by a given start point and points subsequent to the start point, is filled or painted, a position of each of the points being determined by individual x- and y-coordinates defined on said two-dimensional bit map plane, said system comprising:
   first and second bit map memories;
   means for writing the start point and the subsequent points in said first bit map memory;
   means for selecting points from a group comprising the start point and the subsequent points, and writing the selected points in said second bit map memory, said selected points being located on memory scan lines defined in said second bit map memory; and
   means for performing a predetermined arithmetic operation on data of each point in said first bit map memory with data of the point in said second bit map memory corresponding to a point in said first bit map memory, to obtain a filled or painted area of said closed curve.

7. A system according to claim 6, further comprising:
   means for, if w points b0, b1, ..., b(w−2), and b(w−1) are present on one of the scan lines in said second bit map memory, performing exclusive ORed operation on data of j points b0, b1, ..., b(j−2), and b(j−1) selected from the w points, and writing the exclusive ORed data of the j points in said second bit map memory, where each of said w and j is a positive integer (W less than or equal to 1; j less than or equal to 1).

8. A system according to claim 7, wherein said selecting means includes means for generating each of the selected points in accordance with the changes dx and dy from an immediately preceding point and other changes dx and dy to an immediately subsequent point.

9. A system according to claim 7, wherein said second control means includes means for, if the change dy has a value other than zero, generating the selected point in accordance with the change dy from an immediately preceding point and another change dy to an immediately subsequent point.

10. A system according to claim 7, wherein said fourth control means includes means for obtaining pattern data corresponding to the filled or painted area, by ORed operation of data of a point stored in said first bit map memory with that of a corresponding point stored in said second bit map memory.

11. A system according to claim 7, further comprising means for dividing the closed curve into a plurality of regions if the size of the area enclosed by the closed curve exceeds the memory capacity of each of said first and second bit map memories.

* * * * *